(12) United States Patent
Kassemi et al.

(10) Patent No.: US 10,869,170 B2
(45) Date of Patent: Dec. 15, 2020

(54) EMAIL BASED E-COMMERCE WITH SMS AND SOCIAL MEDIA

(71) Applicant: SWOOP IP HOLDINGS LLC, Wilmington, DE (US)

(72) Inventors: James Kassemi, Albuquerque, NM (US); John P. Killoran, Jr., Albuquerque, NM (US); Patrick Killoran, New York, NY (US); Isaiah Baca, Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 1611 days.

(21) Appl. No.: 14/716,381

(22) Filed: May 19, 2015

(65) Prior Publication Data

US 2015/0332365 A1  Nov. 19, 2015

Related U.S. Application Data

(60) Provisional application No. 62/000,268, filed on May 19, 2014.

(51) Int. Cl.
*G06Q 40/00* (2012.01)
*H04W 4/14* (2009.01)
(Continued)

(52) U.S. Cl.
CPC .......... *H04W 4/14* (2013.01); *G06F 16/9558* (2019.01); *G06F 40/134* (2020.01);
(Continued)

(58) Field of Classification Search
USPC .......................................................... 705/41
See application file for complete search history.

(56) References Cited

U.S. PATENT DOCUMENTS 6,773,129 B2 * 8/2004 Anderson, Jr. .......... H01H 9/18
362/394
8,606,703 B1 12/2013 Dorsey et al.
(Continued)

OTHER PUBLICATIONS

Internal Control in the Planning and Realization of Internet Sales by Pavlova, Lilia. https://search.proquest.com/docview/1814300133/fulltextPDF/16842C682B0846BDPQ/1?accountid =14753 (Year: 2015).*

(Continued)

*Primary Examiner* — Hani M Kazimi
*Assistant Examiner* — Hatem M Ali
(74) *Attorney, Agent, or Firm* — Volpe Koenig

(57) ABSTRACT

Methods for email-based e-commerce using SMS and social media and for an e-commerce stock management system are disclosed. A method for email-based e-commerce using SMS includes receiving, via a social media network, a request from a customer to make a payment via email; generating a first email message that includes a mailto hyperlink and solicits payment in a predetermined amount; transmitting the first email message to the customer; and receiving an email message from the customer confirming payment in the predetermined amount. A method for an email-based financial management system includes storing user based settings, based on stock market events and a plurality of predetermined actions; determining when a stock market event occurs; transmitting a confirmation email to a customer requesting confirmation to perform a predetermined action; receiving a confirmation email from the customer to perform the predetermined action; and performing the predetermined action.

11 Claims, 25 Drawing Sheets

(51) Int. Cl.
*G06Q 30/06* (2012.01)
*H04L 12/58* (2006.01)
*H04L 29/08* (2006.01)
*G06F 16/955* (2019.01)
*G06F 40/134* (2020.01)

(52) U.S. Cl.
CPC ......... *G06Q 30/0613* (2013.01); *H04L 29/08* (2013.01); *H04L 51/00* (2013.01); *H04L 51/18* (2013.01); *H04L 51/38* (2013.01); *H04L 67/10* (2013.01); *H04L 51/32* (2013.01)

(56) References Cited

U.S. PATENT DOCUMENTS

| | | | |
|---|---|---|---|
| 8,725,635 | B2 | 5/2014 | Klein et al. |
| 8,762,272 | B1 | 6/2014 | Cozens et al. |
| 10,395,223 | B2 | 8/2019 | Muthu et al. |
| 10,515,345 | B2 | 12/2019 | Koh et al. |
| 2009/0006233 | A1 | 1/2009 | Chemtob |
| 2011/0313921 | A1* | 12/2011 | Dheer ............ G06Q 20/223 705/42 |
| 2012/0253896 | A1* | 10/2012 | Killoran, Jr. ...... G06Q 10/107 705/14.4 |
| 2015/0195227 | A1* | 7/2015 | Kassemi ............ H04L 63/08 709/206 |
| 2016/0078448 | A1* | 3/2016 | Dorsey ............ G06Q 20/023 705/39 |
| 2016/0308840 | A1* | 10/2016 | Munshi ............ H04L 63/083 |
| 2017/0214665 | A1* | 7/2017 | Marlow ............ H04L 9/0841 |

OTHER PUBLICATIONS

The Impact of Mobile Usage and Social Media on E-Commerce Acceptance and Implementation in Saudi Arabia by Makki, Eyad; Chang, Lin-Ching. https://search.proquest.com/docview/1705667380/16842C682B0846BDPQ/2?accountid=14753 (Year: 2015).*

An Overview of Mobile Commerce in India by Sing, Vivek Rajbahadur https://search.proquest.com/docview/1528096448/93301ADD4724206PQ/5?accountid=14753 (Year: 2014).*

* cited by examiner

| | | | | 300 | |
|---|---|---|---|---|---|
| | | Hello, Robert | | | Log Off |

| Accounts | Trading | Research | Banking | Retirement |
|---|---|---|---|---|

| Trade | Portfolios | Orders | Balances | History | IPO | Active Trading | Options | Futures | |
|---|---|---|---|---|---|---|---|---|---|

| Stocks | Options | Mutual Funds | Bonds | Conditional |
|---|---|---|---|---|

Account: 0353367-00411 Robert Socks      [Positions]  [Orders]       301

S&P500

Alerts  303  r.socks@email.com
302        304
■Email  ☐SMS  ☐FaceBook  ☐Twitter

| Symbol | %Change | Price | Volume |
|---|---|---|---|
| KMB | +.034 | 110.94 | -9.7 |
| TWC | +.12 | 135.82 | -9.5 |
| WM | +0.30 | 40.73 | -47.1 |
| COP | +0.32 | 68.61 | -13.3 |
| CMI | +0.26 | 144.72 | -15.0 |

Stock [KMB]

Alert Price [99.99]   Current Price [110.94]

Frequency [30 min]

Monitor Length [24 Hr]

Buy Button ■     Quantity [50]

Sell Button ☐    Account Access ■

[Confirm]

Figure 3

EMAIL BASED E-COMMERCE WITH SMS AND SOCIAL MEDIA

CROSS REFERENCE TO RELATED APPLICATION

This application claims the benefit of U.S. Provisional Application No. 62/000,268, filed May 19, 2014, which is incorporated by reference as if fully set forth.

FIELD OF INVENTION

The present invention is related to electronic payment systems.

BACKGROUND

Many online systems that offer conveniences such as adjusting a 401K account, managing a stock portfolio or paying bills online rely on customers to remember a password and additional account information. Although convenient, the sheer number of passwords and account information in a customer's online life has created a new burden. Additionally, they do not lend themselves to maintaining an ongoing communication with the client nor do they lend themselves to quick reaction or adjustments. These obstacles are magnified in the moment when they are most needed, for example, a moment of crisis or opportunity. An ongoing series of emails that update a customer and offer options to change or adjust accounts, delegating new proportions within their account, paying fees, and selling and buying stock by email may be welcome in the marketplace.

Currently, customers have a limited selection of using a credit card, debit card, or PayPal account when making payments online. Many of the disadvantages associated with these systems relate to their integration with mobile applications. Alternative payment systems that utilize other formats, such as email, may be desired. A system where registered users may make secure financial transactions by email rather than by visiting a Uniform Resource Locator (URL) represents a great convenience to the consumer.

The email address is the de facto basis of identity for virtually all online accounts. In order to open accounts with any online service, an email address is necessary. Enabling a consumer to use the security of their email client to authorize payments streamlines a process that may be very time consuming and irritating. With limited screen space and internet connection this frustration is exacerbated when on mobile devices. Secure email transactions, based in an email based e-commerce system, have logical extensions in other media. Simultaneous messaging to other media (for example, texts, Short Message Service (SMS), Multimedia Messaging Service (MMS), and social media) may become an extension of the technology. Other systems like online stock portfolios, bill payment, and invoicing may make use of a secure email system.

Various methods exist to make payments on a mobile device. One popular way to make donations and payments is using SMS. The carriers place SMS charges on phone bills. One drawback to payments by SMS is that carriers can dictate fees that comprise a high percentage of the customer's payment. This is particularly frustrating to nonprofits and their donors as it relates to charitable donations. The nonprofits and their donors would welcome a method that allows customers to access payments via SMS, but be charged by a different party other than the carrier that charges a much lower fee for each transaction.

SUMMARY

In order to make a financial transaction online, a customer often needs to visit a website and must enter their credit card information or banking information. The alternative to this process is to register with @Pay's email payment gateway. Using @Pay's email payment gateway, a registered user may send and receive payments and make purchases via email by selecting a mailto link and sending an email confirming the details of the transaction. The @Pay e-commerce system parses the message and processes the payment. As described in greater detail herein, the mailto link may be extended into SMS messaging and social media. Although email based, the mailto link may be included in other media formats such as SMS and social media. Many new mobile devices such as smartphones may be enabled to move from one application to the email client once the mailto link is selected. The email e-commerce system is designed to include these other messaging systems.

In other forms of social media, for example, Facebook, Twitter, GooglePlus Linkedin, Instagram, Pinterest, Swapchat, Tumblr, and the like, the user may request an email offer via a link provided in that social media. Alternatively, the user may receive a mailto link allowing them to generate the email within their email client program or complete the transaction through their individual media.

As another extension of the email based e-commerce system, the capacity to send and receive payments may be configured to allow for bill paying or invoicing on a limited or large scale. Individual customers may locate vendors to whom they owe a payment, and then sign up, and pay by email. Vendors or individual customers may also send invoices to request payment by email. This in turn may integrate into an invoicing system where vendors may use a designed interface or integrate the @Pay technology in their existing invoicing system to send their customers email invoices with the mailto link pay buttons. The customers may select one of the mailto link pay buttons and pay immediately.

Because this system relates to secure email transactions, it lends itself to other forms of finances, for example, stock management (e.g., e*trade, Ameritrade, or the like). For example, a system may be designed where customers manage financial accounts by responding to secure @Pay emails, allowing the customers to reallocate resources of their financial portfolios or other financial management systems. This may include an array of buttons with various options based on criteria predetermined by the customer. A financial analyst or third party suggesting changes to the account may also generate criteria.

BRIEF DESCRIPTION OF THE DRAWING(S)

A more detailed understanding may be had from the following description, given by way of example in conjunction with the accompanying drawings wherein:

FIG. 3 is an example of a customer's account page with the financial management system;

DETAILED DESCRIPTION OF THE PREFERRED EMBODIMENT(S)

When used herein, the term "token" may refer to a sequence of byte data or string or file used to authenticate a transaction. A token may be one or multiple encrypted strings, files, passwords, cyphers or other data which may contain information used to perform or authenticate a transaction when sent to payment servers. These tokens may be encrypted using a public-private key encryption system. The vendor or a party with knowledge of the vendor's private key may generate an encrypted token. Alternatively, a payment system or e-commerce site may generate this token on behalf of the vendor.

The email-based e-commerce system that facilitates payments using email may be also used in conjunction with SMS, MMS and Social Media to make payments for donations, products, services, bills invoices and stock trading. For the purposes of this application Multimedia Messaging or MMS would function in the same way as SMS. The terms email payment gateway and e-commerce system are synonymous.

Figure 1:
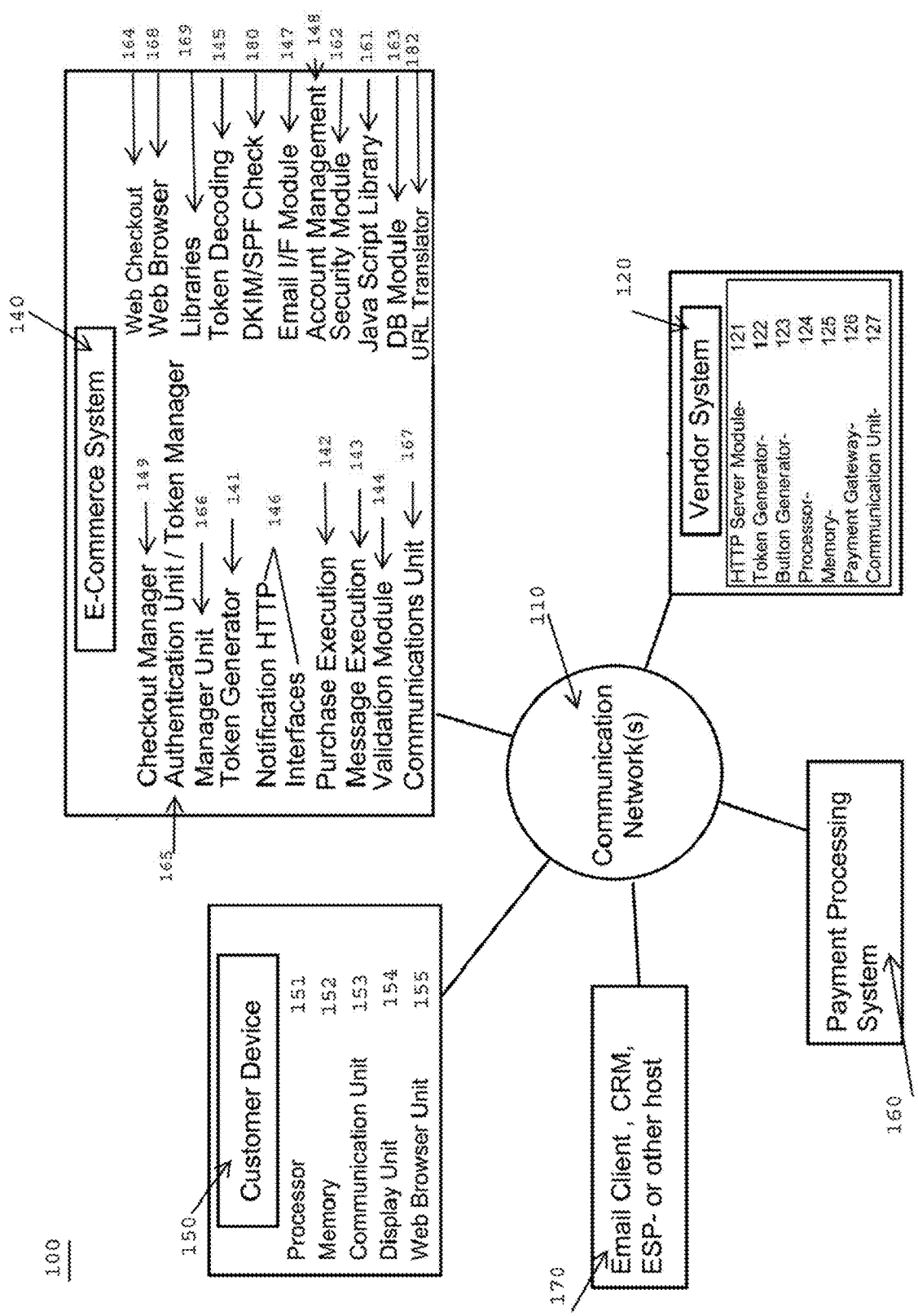
FIG. 1 illustrates a system diagram of an email-based e-commerce system that integrates SMS and social media for online e-commerce.

FIG. 1 illustrates a system diagram of an email-based e-commerce system that integrates SMS and social media for online e-commerce. It describes the integration of investment portfolio management and bill payment. FIG. 1 shows an example system 100 that may be used for vendor token generation that may be used in e-commerce transactions. The example system 100 includes a customer device 150, a vendor server 120, an e-commerce system 140, a banking server (not shown), a payment processing system 160, and an email service provider 170 that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, or any other appropriate computing device. The customer device 150 may utilize short message service (SMS) messages, multimedia messaging service (MMS), social media apps, web browsing, and or email. For example, social media apps may include Facebook, Twitter, GooglePlus+, LinkedIn, Instagram, Pinterest, Swapchat, Tumblr, and the like. The customer device 150 includes a processor 151, memory 152, a communications unit 153, a display unit 154 and web browser unit 155, which may communicate data to/from the web server module(s) in the vendor server 120 and payment server 140. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices (not depicted) that are included in, or connected to, the customer device 150, such as a liquid crystal display (LCD) display or monitor. The customer device 150 may receive an input from a user from an input device (not depicted) that is included in, or connected to, the customer device 150, such as a keyboard, a mouse, a microphone or a touch screen, and provide data that indicates the input to the web browser unit 155.

The vendor system 120 may include an HTTP server module 121, a token generator 122, a button generator 123, a processor 124, memory 125, a payment gateway 126 and a communications unit 127. The vendor system may be substituted for a financial management system as illustrated in the examples described herein.

The HTTP server module 121 provides a website that may be accessed by a customer device 150. The HTTP server module 121 may implement the HTTP protocol, and may communicate Hypertext Markup Language (HTML) pages and related data from the website to/from the customer device 150 using HTTP. The vendor server 120 may be connected to one or more private or public networks (such as the Internet), via which the HTTP server module 121 communicates with devices such as the customer device 150. The HTTP server module 121 may generate one or more web pages, may communicate the web pages to the customer device 150, and may receive responsive information from the customer device 150.

The HTTP server module 121 may be, for example, an NGINX server, an APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The payment gateway 126 may be a proprietary service that directly connects with the payment processors, such as the banking server or the payment processing system 160 to handle credit card data and authorize credit card payments.

The token generator 122 may generate tokens for use in e-commerce transactions. Tokens may be encrypted strings which contain information to perform a transaction when sent to the e-commerce system 140. A token may be one or multiple encrypted strings, files, passwords, cyphers or other data which may contain information used to perform or authenticate a transaction. A token may include one or more parameters, for example a customer ID, vendor information, product information, and the like.

The button generator 123 may create cross-client and cross-browser compatible buttons for email checkouts. In one embodiment, the button generator 123 may include the token generator 122 to automatically generate an associated token for each button that is created.

A button and an associated token, generated by the button generator 123 and/or the token generator 122 may be embedded on a web page created by the HTTP server module 121.

The memory 125 may be configured to store information associated with e-commerce transactions. This may include inventory information, information used to generate web pages, customer information, and other e-commerce data. The e-commerce system 140 may include a token generator 141, a purchase execution module 142, a message execution module 143, a validation module 144, a database module 163, a token decoder 145, a notification HTTP module 146, an email interface module 147, an account management unit 148, checkout manager 149, web checkout 164, JAVA script library 161, a security module 162, authentication unit/token manager 165, manager unit 166, communications unit 167, web browser 168, libraries 169, DKIM/SPF check 180, and a Universal Resource Locator (URL) translator 181. While only one vendor system 120 is shown communicating with the e-commerce system 140, this is shown as an example only. The e-commerce system 140 may communicate with an internal or external email service provider (ESP) 170 and an internal or external payment processing system 160. The e-commerce system 140 may communicate with multiple vendor systems 120.

Similarly, vendors may register with the e-commerce system 140. The e-commerce system 140 may provide the vendor system 120 with a public key and private key to be used in token transaction in accordance with the methods described herein. When a transaction is attempted (e.g. for invoices and payments), the e-commerce system 140 decodes the token, authenticates the sender of the email, which may allow the transaction to be processed. While the e-commerce system 140 is depicted as a separate entity in FIG. 1, this is shown as an example only. The e-commerce system 140 may be controlled and/or co-located with the vendor system 130, and/or the email service provider 170.

The token generator 141 may generate tokens for use in e-commerce transactions. Tokens may be encrypted or plain text strings which contain information to perform a transaction when sent to the e-commerce system 140. A token may be one or multiple encrypted strings, files, passwords, cyphers, plain text or other data which may contain information used to perform or authenticate a transaction. While FIG. 1 shows the token generator 141 as being a part of the e-commerce system 140, it may be hosted by any trusted party with access to the private key. For example, the banking server may include a token generator 141. A token may include one or more of the following parameters or other parameters not listed below:

Private-key: The private key provided by the e-commerce system 140.

Public-key: E-commerce system's 140 public key, provided by the e-commerce system 140.

Auth-key: Any additional data that may be used to authenticate the transaction, including, but not limited to, biometric identification, location data and other fraud detection systems.

Partner-id: The partner ID given provided by the e-commerce system 140.

Environment: The environment the vendor wants to generate buttons for. This distinguishes whether the token is being used in a testing environment or in the live environment (and running real transactions).

Type: The type of token to generate (e.g. bulk, email-targeted, etc.). There are multiple types of tokens that a token generator may generate and decode. For example, site tokens may be used for website transactions, email tokens for minimum-of-clicks email payments, and universal tokens for email validations.

Card: The card token associated with the recipient of this token. When a customer is registered with the e-commerce system 140, the vendor receives a credit card token—a unique identifier that references the specific card associated with that customer and vendor. When the vendor is generating a token to submit to e-commerce system 140, they may include the card token as a customer identifier.

Email: The email associated with the receipt of this token.

URL: The Signup URL the recipient may go to if customer doesn't have payment information registered with e-commerce system 140.

Amount: The amount a customer should be charged for the transaction the token is generated for.

User-data: Data to pass back as a reference. This data may include custom data that the vendor may want to pass through the e-commerce system 140 and receive back when a transaction has completed. It may include an item reference number or SKU, customer address, or other piece of data that is not required by e-commerce system 140 to complete a transaction, but that the vendor wants associated with that transaction.

Expires: Expiration date for token, integer value of seconds since epoch.

Header-user-agent: The HTTP_USER_AGENT from the request header. HTTP headers are sent as part of a request from a customer's web browser unit within customer device 150 for a piece of information. These headers define the parameters that the web browser unit is expecting to get back. The user-agent is the identifier of the software that is submitting the request—typically the identifier of the web browser unit that is requesting the content.

Header-accept-language: The HTTP_ACCEPT_LANGUAGE from the request header. The accept-language is the acceptable language for the response—e.g. the language in which the web browser unit is requesting the content be sent back.

Header-accept-charset: The HTTP_ACCEPT_CHARSET from the request header. The accept-charset is the character sets that are acceptable for the response—e.g. the character set in which the web browser unit is requesting the content be sent back.

IP-address: The IP address of the token recipient.

In one example, a bulk token may omit the card and email fields, thereby allowing for the tokens to be shared. Additionally, or alternatively, a bulk token may include the card field and/or email field but the e-commerce system 140 may be configured to ignore those fields and/or other fields based on the type field.

The purchase execution module 142 facilitates the execution of payments between a customer and a vendor.

The message execution module 143 is configured to analyze received messages and communicate with the token decoder 145 to determine if the received message is valid and to identify the request embedded in the message (e.g. request for purchase of goods.) If the token decoder 145 indicates the token is valid, the message execution module 143 may then access the account management unit 148 to verify a transaction.

The database module 163 serves as a database to store information that may be accessed by the e-commerce system 140.

The token decoder 145 may be configured to decode tokens received from external sources, such as a vendor system 120 or a customer device 150.

The validation module 144 may serve to authenticate received emails, using the DomainKeys Identified Mail (DKIM) and/or Sender Policy Framework (SPF) protocols. For example, SPF allows a domain owner to add a file or record on the server that the recipient server cross-checks. Similarly DKIM may be used to embed information within the email. While these specific validation/authentication protocols are discussed herein, any known validation/authentication protocol may be used and the use of the DKIM/SPF protocol is used only to enhance the understanding of the reader by using a specific possible validation/authentication protocol.

Generally, SPF is an email validation system designed to detect email spoofing by providing a mechanism to allow receiving mail exchangers to check that incoming mail from a domain is being sent from a host authorized by that domain's administrators. The list of authorized sending hosts for a domain may be published in the Domain Name System (DNS) records for that domain in the form of a specially formatted TXT record. Sender Policy Framework is described in IETF publication RFC 7208, which is incorporated by reference as if fully set forth.

The Simple Mail Transfer Protocol (SMTP) permits any computer to send an email claiming to be from any source address. SPF allows the owner of an Internet domain to specify which computers are authorized to send email with sender addresses in that domain, using Domain Name System (DNS) records. Receivers verifying the SPF information in TXT records may reject messages from unauthorized sources before receiving the body of the message.

The sender address is transmitted at the beginning of the SMTP dialog. If the server rejects the sender, the unauthorized client should receive a rejection message, and if that client was a relaying message transfer agent (MTA), a bounce message to the original sending address may be generated. If the server accepts the sender, and subsequently also accepts the recipients and the body of the message, it should insert a Return-Path field in the message header in order to save the sender address.

Generally, DKIM is an email validation system designed to detect email spoofing by providing a mechanism to allow receiving mail exchangers to check that incoming mail from a domain is authorized by that domain's administrators. A digital signature included with the message may be validated by the recipient using the signer's public key published in the DNS. DKIM is the result of merging DomainKeys and Identified Internet Mail. Prominent email service providers implementing DKIM include Yahoo, Gmail, AOL and FastMail. Any mail from these organizations should carry a DKIM signature.

More specifically, both, signing and verifying modules are usually part of a mail transfer agent (MTA). The signing organization may be a direct handler of the message, such as the author, the originating sending site or an intermediary along the transit path, or an indirect handler such as an independent service that provides assistance to a direct handler. In most cases, the signing module acts on behalf of the author organization or the originating service provider by inserting a DKIM-Signature: header field. The verifying module typically acts on behalf of the receiver organization.

DKIM is independent of Simple Mail Transfer Protocol (SMTP) routing aspects in that it operates on the RFC 5322 message—the transported mail's header and body—not the SMTP envelope defined in RFC 5321. Hence, the DKIM signature survives basic relaying across multiple MTAs. DKIM allows the signer to distinguish its legitimate mail stream. This ability to distinguish legitimate mail from potentially forged mail has benefits for recipients of e-mail as well as senders, and "DKIM awareness" is programmed into some e-mail software.

The "DKIM-Signature" header field, by way of example, may include a list of "tag=value" parts. Tags are short, usually only one or two letters. The most relevant ones are b for the actual digital signature of the contents (headers and body) of the mail message, bh for the body hash, d for the signing domain, and s for the selector. The default parameters for the authentication mechanism are to use SHA-256 as the cryptographic hash and RSA as the public key encryption scheme, and encode the encrypted hash using Base64. The receiving SMTP server uses the domain name and the selector to perform a DNS lookup. For example, given the signature:

DKIM-Signature: v=1; a=rsa-sha256; d=example.net; s=brisbane;

c=relaxed/simple; q=dns/txt; l=1234; t=1117574938; x=1118006938;

h=from:to:subject: date:keywords:keywords;

h=MTIzNDU2Nzg5MDEyMzQ1Njc4OTAxMjM0NTY
  3ODkwMTI=;
b=dzdVyOfAKCdLXdJOc9G2q8LoXSlEniSbav+
  yuU4zGeeruD00lszZ VoG4ZHRNiYzR.

A verifier queries the TXT resource record type of brisbane.\_domainkey.example.net. The selector is a straightforward method to allow signers to add and remove keys whenever they wish—long lasting signatures for archival purposes are outside DKIM's scope. Some more tags are visible in the example:

v is the version,
a is the signing algorithm,
c is the canonicalization algorithm(s) for header and body,
q is the default query method,
l is the length of the canonicalized part of the body that has been signed,
t is the signature timestamp,
x is it's expire time, and
h is the list of signed header fields, repeated for fields that occur multiple times.

The DKIM-Signature header field itself is always implicitly included in h.

The data returned from the verifier query is also a list of tag-value pairs. It includes the domain's public key, along with other key usage tokens and flags. The receiver may use this to then decrypt the hash value in the header field and at the same time recalculate the hash value for the mail message (headers and body) that was received. If the two values match, this cryptographically proves that the mail was signed by the indicated domain and has not been tampered with in transit.

Signature verification failure does not force rejection of the message. Instead, the precise reasons why the authenticity of the message may not be proven should be made available to downstream and upstream processes. Methods for doing so may include sending back a message, or adding an Authentication-Results header field to the message as described in RFC 7001, which is incorporated as if fully set forth.

While DKIM and SPF protocols are discussed herein, validation module 144 may perform any authentication and validation type protocols. DKIM and SPF are used to provide examples of such validation protocols that may be performed in validation module 144.

The notification HTTP module 146 delivers notices of events to external systems, such as an HTTP endpoint the vendor configures to update their internal database when a transaction is executed.

An email interface module 147 may be configured to parse emails for action by the e-commerce system 140.

The account management unit 148 is configured to manage accounts registered with the e-commerce system 140. A customer or vendor, wishing to complete a transaction with an e-commerce system 140 may register his/her email address and payment information with the e-commerce system 140. The account management unit 148 may be configured to store a customer registry and a vendor registry.

The security module 162 may be configured to perform additional security measures to prevent unauthorized access to the system or fraud.

The email service provider 170 may be associated with the vendor system 120, the e-commerce system 140, or may be a third party entity. The email service provider 170 may be configured to provide email marketing services. The email service provider 170 may further be configured to provide tracking information showing the status of email sent to each member of an address list. The email service provider 170 may further be configured to segment an address list into different interest groups or categories to send targeted information. The email service provider 170 may also parse messages based on the secondary system of email-targeted tokens. The email service provider 170 may also be configured to send trigger emails based on responses from the vendor system 120 or customer behavior. The email service provider 170 may further be configured to create or use templates generated by the e-commerce system 140. The templates may be used for sending information to contacts. Email service provider 170 may include a customer interface that allows a customer to adjust the template or it may be integrated with external sources (e.g. vendor system 120 or e-commerce system 140). The email service provider 170 may comprise a send engine (not shown), which allows vendors to distribute their message that may be received by one or more customer device(s) 150. The email service provider 170 may further include a tool for generating mailto links, graphic buttons, and tokens. The email service provider 170 may be configured to dynamically customize the content of emails that are sent out, to tailor personalized information and mailto links.

The banking server (not shown) may be controlled by a third party system bank. The e-commerce system 140 may communicate with the banking server to verify that the customer has adequate funds or credit for the requested payment. For example, the banking server may be a controlled by VISA, AMERICAN EXPRESS, MASTERCARD or any other banking or financial network that a customer may use for online payment. The banking server may be an automatic clearing house services (ACS). The banking server may be an interface for a centralized or decentralized virtual currency system or protocol such as frequent flyer miles, "reward" points, or Bitcoin.

The email-based e-commerce system 140 may allow vendors to send advertising emails or bills with a mailto link associated with a specific product offer (or payment amount) and select the mailto link and generate a response email by selecting the mailto link. This response email contains a token and is addressed to the e-commerce system 140. Once sent, this response email confirms the customer's payment for the product (or prepayment of a bill) by parsing the information in the token. The e-commerce system 140 processes the payment and notifies the vendor system 120 and the customer device 150. The e-commerce system 140 may comprise a token generator 141 as well as components for processing the tokens and components for processing the payments and a system for notifying the vendor system 120 of the transaction details.

The functionality of the offer, mailto link, and response email is described in U.S. patent application Ser. No. 14/324,807 filed Jul. 7, 2014 entitled EMAIL-BASED E-COMMERCE, which is a continuation of U.S. patent application Ser. No. 13/074,222 filed Mar. 29, 2011, which issued on Jul. 8, 2014 as U.S. Pat. No. 8,775,263 entitled SYSTEM AND METHOD FOR EMAIL-BASED E-COMMERCE, and U.S. patent application Ser. No. 13/074,235 filed Mar. 29, 2011 entitled EMAIL-BASED DONATIONS, which applications are incorporated by reference as if fully set forth.

Referring back to the example system in FIG. 1, the payment processing system 160 may be an independent third party operated unit, it may be located in the e-commerce system 140 or the vendor system 120.

While the example system shown in FIG. 1 shows the e-commerce system 140 comprising the token generator 141, this is shown as an example only. The vendor system 120 may also include a token generator that allows vendors to directly create tokens. In another example, a third party may have a token generator to create tokens for use by the vendor system 120.

System 100 may not require the vendor system 120 to host the token generator 141 on their system. System 100 uses the web browser's ability to transmit a message securely between two frames of a page and validating the URLs of those two pages.

Mailto links in the email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a "blind" copy of the new message should be sent; a field that indicates the subject of the new message; and a field that indicates the body of the new message. The mailto links may be defined according to the format described in Internet Engineering Task Force (IETF) RFC2368, which is incorporated by reference as if fully set forth herein. The mailto link may be accessed with a corresponding short URL.

The e-commerce system 140 may include a database of registered customers, such as for payment processing. The e-commerce system 140 may identify a customer by their email address and may decode tokens included in the content of an email and process payments based on the data in the token. A vendor that is associated with the e-commerce system 140 may send emails with the tokens generated for processing by the e-commerce system 140. When generating tokens, a related URL checkout page with a matching offer is generated. This allows vendors via vendor system 120 to send emails with payment options, including payments for product offers, donations, services and gift cards, for example, with each offer associated with a token and a URL checkout page. The token is associated with a mailto link. A customer may activate the mailto link by selecting (or "clicking on") the link and send the message to the e-commerce system 140. The e-commerce system 140 may then identify the email address and decode the token. If the e-commerce system 140 determines that the email address is not registered in the database, the e-commerce system 140 sends an email back to the customer with a URL link that is a checkout. This checkout is prepopulated based on the customer's mailto link selection based on the content of the token. The URL captures the payment information and registry information. The e-commerce system 140 updates the database once the new customer is registered. In future transactions, the email address of the customer is identified as registered by the e-commerce system 140 and the payment is processed exclusively through an email payment gateway.

An email-based e-commerce system 100, as described herein, allows an email payment opportunity. This may include an email advertisement offering a product or service which is sent to customers and contains one or more mailto links. Each mailto link may relate to an item (e.g. service or product). If the mailto link is selected by a customer, an email message associated with an item or items is generated. Within that generated email message is a token that includes encoded information such as the purchase amount, the merchant, or an item identifier. The information contained in the token includes details for both the completion of email transaction and details that provide context and direction for the process of completing a transaction when the details included within the token are not sufficient. This may include details about the composition of a page to collect more information from the customer (where the required fields and information about those fields are stored directly in the token), a pointer to a location where the composition of a page to collect more information is stored (where the required fields and information about these fields are indirectly referenced by data in this token for retrieval at a later time), or a pointer or description of a routine to execute in case of failures (e.g. a response email in the case of product unavailability). This mailto link may be generated by a vendor through a web interface tool, or by using the e-commerce system 100 to programmatically create either the token or the full mailto link.

For a customer to complete an email transaction, the customer's payment information may be contained in the email e-commerce system database 163. In order to determine if the customer's payment information is in database 163 the token may be decoded to recognize the customer when the email arrives at the e-commerce system 140. The vendor sends the first email via the vendor system 120. The customer via customer device 150 responds by activating a mailto link by sending the response to the e-commerce system 140. If the customer is registered and the incoming email is authenticated, when the token is decoded, the transaction is processed.

If the customer is not registered, a web checkout page may be needed. Additional information may be encoded within the email token that describes a web checkout page for the email offer. The vendor's email may thereby serve multiple purposes. One enables the email to perform as an email payment, if the customer is registered, and another enables the unregistered customer to be sent a web checkout 164. The web checkout 164 may be prepopulated with additional information based on the customers' original selection that is decoded from the token. The additional information included within the token identifies remote resources, which may include an input display and validation components. The remote resource may function as a plugin, as a reference to information stored in a database, or as a hook into the execution of an independent function.

When the web checkout 164 page is being loaded by the customer, the input display may provide the requirements for displaying the field on the form, including field name, entry box length, and other properties of the input field.

When the form has been filled out by the customer and is submitted, these form fields are sent to the validation resource to confirm that the information entered meets the formatting, length, data type, and any other requirements of the field. If validation resource returns a "pass" condition for the form, submission continues to the e-commerce system 140. If the validation resource returns a "fail" condition for any data on the form, error messaging may be displayed to the customer, to enable correction of the one or more particular inputs that were identified as incorrect and resubmission again.

These remote resources may be created to describe standard information that may be used across numerous merchants, or they may be used to define custom information that may be used for a single merchant.

Using this system 100, a vendor via vender system 120 may not be required to expend additional computer programming effort because it relies on the email e-commerce system 140. If the offer web page is linked to the email purchase opportunity, the vendor may not be required to modify any existing systems or processes to register customers with the email e-commerce system 140. The vendor may not need to segment their email lists into registered and unregistered customers and the customers are not aware of the distinction within the content of the email. The distinction between customers occurs by virtue of the system relieving both the vendor and the customer of any excess choices or distinctions. The vendor may create offers manually via a web interface, and the email e-commerce system 140 may handle the aspects of the transaction, from receiving the order request, facilitating the payment processing, storing relevant transaction data, sending a receipt, and displaying transaction data to the vendor.

The vendor may integrate directly with an API. The vendor may maintain existing payment flows separate from their email e-commerce solution, or the vendor may use the email e-commerce system as a full-featured payment system for both web and email transactions without doing any software development. Presenting the customer with a clear process that seamlessly migrates the customer to adopt an email-based checkout process eases the customer into a new technology where transactions happen by email instead of on a URL. This system 100 provides a vendor with a more automated or customized way of handling elements that may be achieved through the use of the email e-commerce system 140.

Disclosed is a system and method for email-based e-commerce which allows customers to confirm payments or sales. The email based e-commerce system also allows customers to request other secure actions with a financial management system for controlling individuals and organizations investment portfolio and investment fund alert system. The financial management system may be a brokerage company, a holding company, or another company offering financial services such as the buying or selling of securities as stocks, preferred stocks, futures, bonds, options, fixed income, 401-k Plans, margin lending, mutual funds, exchange traded funds and cash management services among other financial services by smartphone, computer or other electronic trading format. The email e-commerce system may be integrated with a financial management system. A customer's stock portfolio or investment fund allocation held with the financial management system may be adjusted online by a secure web page or other application.

Figure 2:
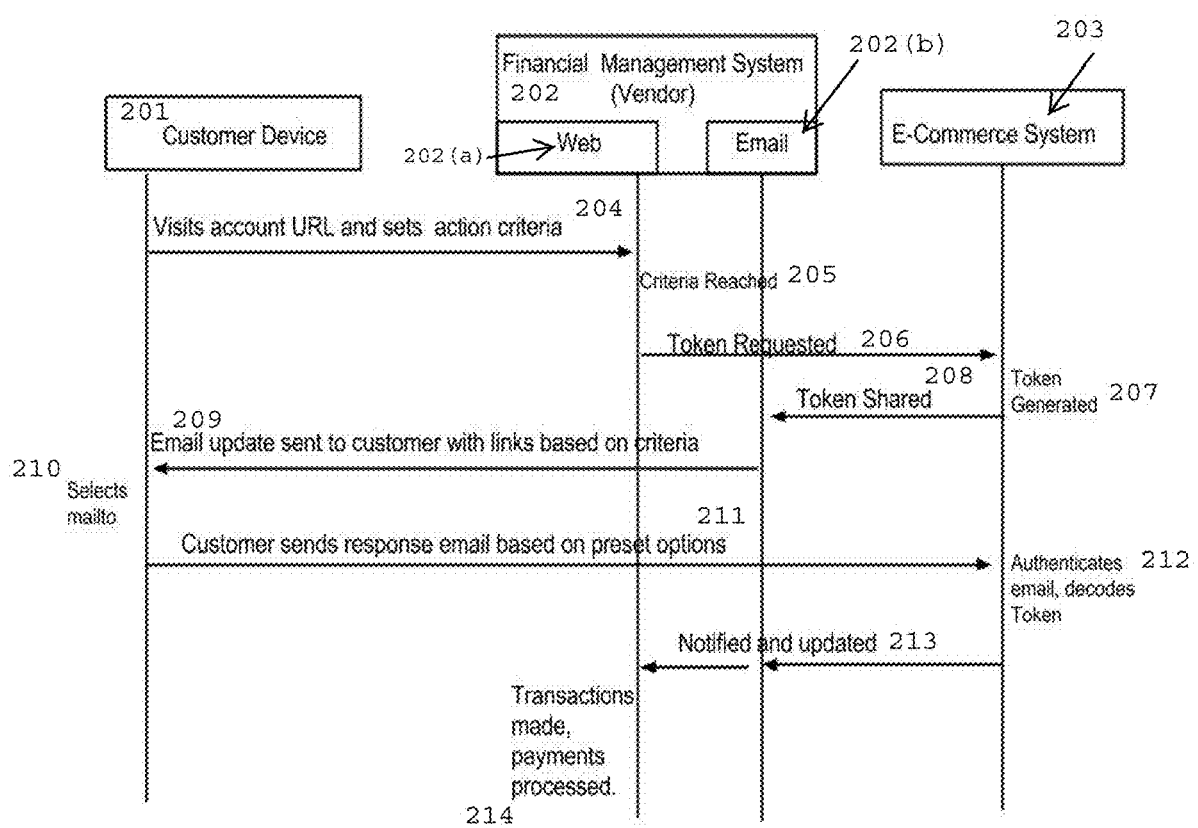
FIG. 2 illustrates a transactional flow diagram using the email-based e-commerce system to allow customers to confirm payments or sales or request other secure actions with a financial management system.

FIG. 2 illustrates a transactional flow diagram for using the email-based e-commerce system to allow registered customers to confirm payments or sales or request other secure actions with a financial management system. A registered customer 201 may logon to their financial management system 202(*a*) account and set criteria for alerts based on market changes (204). On a condition that the criteria are met (205), the financial management system 202(*a*) may request at least one token (206) from the e-commerce system 203. It should be noted that the although the financial management system 202 and the e-commerce system are described as two separate systems for convenience, those of skill in the art would realize that they may be part of the same system and all of the functions may be performed by the same system.

In response to the request, the e-commerce system 203 may generate at least one token (207). The e-commerce system 203 may share the token (208) with the financial management system 202(*b*). The financial management system 202(*b*) may share the token with the customer 201 via email update or alert (209). Using the customer's device to access the email client, the customer 201 selects the mailto link (210) and generates the response email. The response email is addressed to the e-commerce system 203 and includes the token. A response email is then sent (211) to the e-commerce system 203. The response email is authenticated and the token is decoded (212). The e-commerce system 203 notifies (213) the financial management system 202(*a*) of the action requested from the customer 201 and the financial management system 202(*a*) performs the transactions requested and payment is processed (214).

Customers who are not registered are driven to a URL web-based sign up page. This registration may be the same registration that is used with the financial management system or may be a function the customer opts into once they access their online account with the financial management system.

FIG. 3 is an example of a customer's account page with the financial management system. The customer may set the criteria for alerts 301 on this page. The registered customers receive emails with mailto links that allow them to request adjustments in their financial accounts with the financial management system. On this page 300 they can opt into the alert service using email 302, SMS 303, or a variety of social media 304. In the example shown in FIG. 3, the customer has opted into email 302 alerts.

Figure 4:
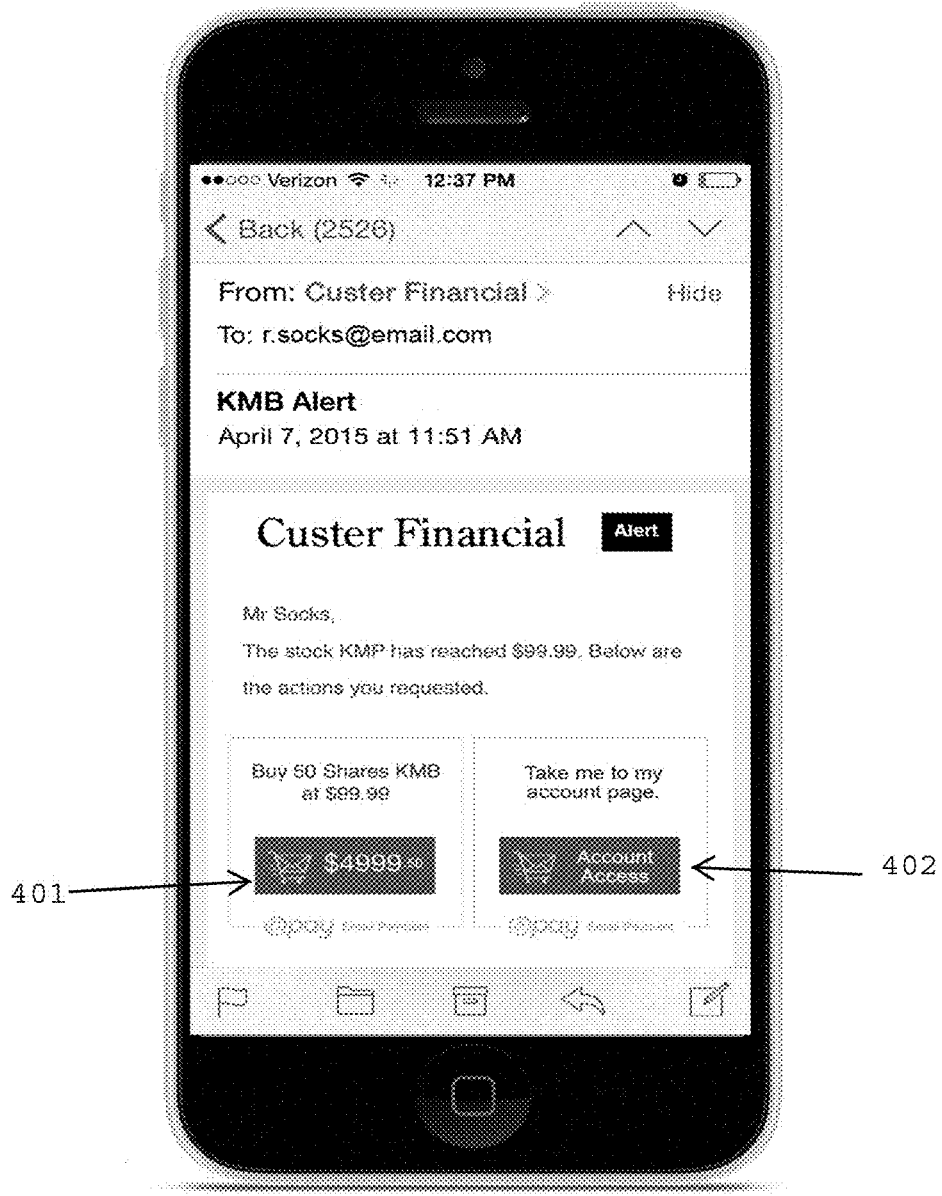
FIG. 4 is an example of an email for secure transactions with the financial management system with mailto link embedded behind images.

FIG. 4 is an example of an email for secure transactions with the financial management system with mailto link embedded behind images. These mailto links are associated with actions defined by the customer on their account page, by a financial advisor, or the financial management system. The customer selects the mailto link 401 and generates a response email addressed to the e-commerce system and containing the token. The customer may also select the account access link 402.

Figure 5:
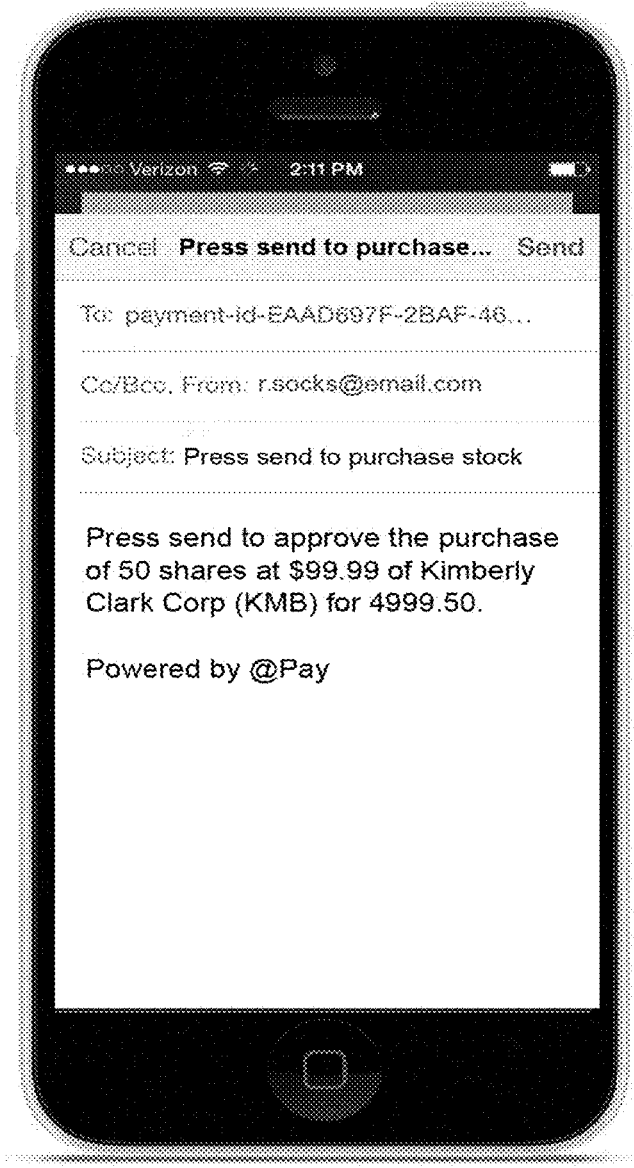
FIG. 5 is an example of a response email for secure transactions with the financial management system.

FIG. 5 is an example of a response email for secure transactions with the financial management system. The token is located in the 'To' field in this example, but the token may be located anywhere in the email. To confirm the transaction, this response email is sent to the email e-commerce system. The email is authenticated and the token decoded. The e-commerce system notifies the financial management system of the customer's transaction request and the financial management system implements the changes to the account based on the customer's criteria and processes any required payments.

In moments of financial crisis or growth the portfolio allocation may be based on a complex set of changes that were predetermined by the investor and investor's advisor and/or the financial management system. The selection may represent an action that affects a wide range of investments within a given portfolio or multiple portfolios. For example, the action may be used to provide financial advice. The system may be preconfigured (or a financial advisor or user may manually) determine a course of action in the case of immediate crisis (or opportunity). The system may be configured to automatically (or at the instruction of a user such as a financial advisor) email an entire group of investors. The information sent to the group of investors may state the market conditions and suggest that an action be taken based on the predetermined plan. Those in agreement may respond and, based on their response, the financial institution may quickly reallocate their investments.

The predetermined plan may not be needed to be actually implemented by an automated processor, it may be as simple as informing the manager that this is a list of individuals that have responded and their responses authenticated. A secure email e-commerce system may also be used in voting on company or shareholder issues or forms of stocks or shares that are not public. Although the above addresses email-based transactions other methods of messaging such as SMS and/or social media may be used. Additionally a customer may be able to request an update on an investment by sending a message to the e-commerce system and financial management system. The customer may receive an update with responses such as buy or sell based on predetermined or automatic selections. The communication with the e-commerce system and financial management system may happen via email, social media or SMS. Disclosed herein are details on how other media such as SMS and social media may be used. The financial management system may also be referred to as the vendor.

Figure 6:
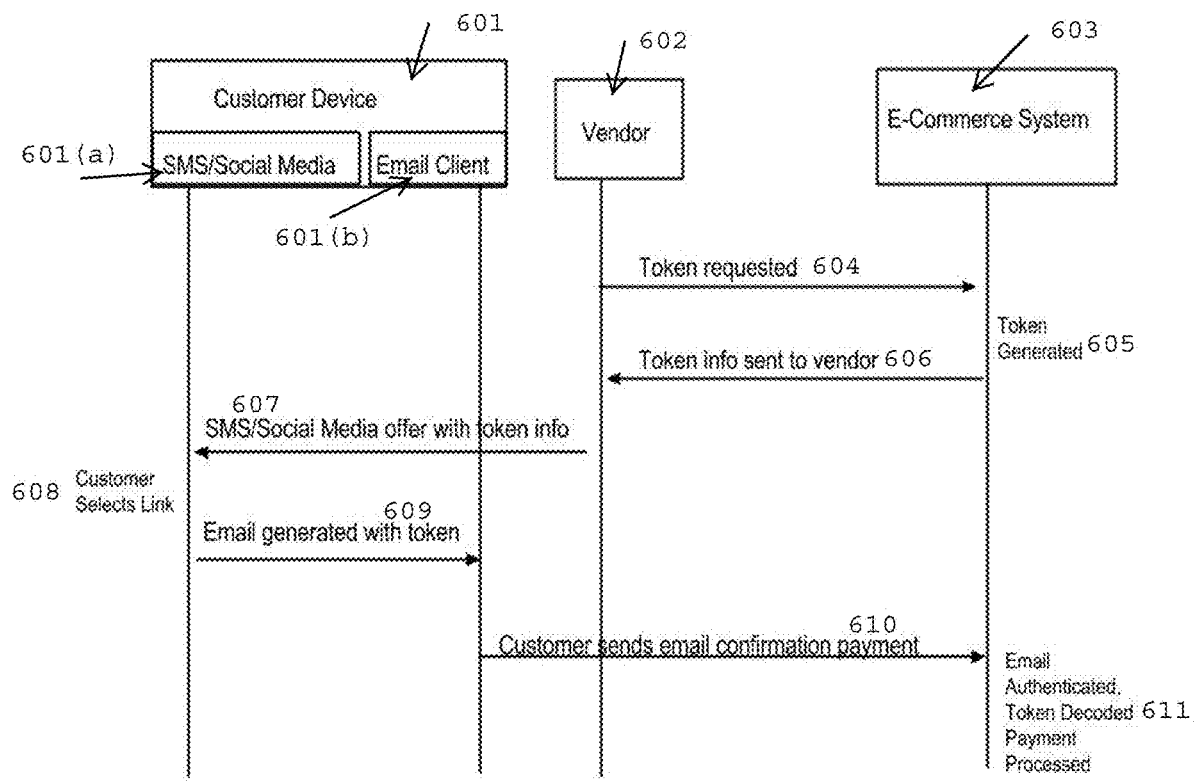
FIG. 6 illustrates a transactional flow diagram using the email based transaction via a text message and social media where at least one mailto hyperlink is included in the message or post.

FIG. 6 is an illustration of a transactional flow diagram using an email based transaction via a text message and social media where at least one mailto hyperlink is included in the message or post. As shown in FIG. 6 a customer mobile device 601, a vendor system 602, and an e-commerce system 603 may communicate for use in electronic payments interfaces between an SMS text messaging system, social media networks, and other online networks where mailto links may include a customer and an email payment gateway. The e-commerce system is synonymous with the email payment gateway. Although the vendor 602 and the e-commerce system 603 are described as separate entities for convenience of explanation, they may comprise a single system.

As shown in FIG. 6, the vendor 602 requests at least one token (604) from the e-commerce system 603. The e-commerce system 603 may generate the token (605) and share the token (606) with the vendor system 602. Each token is embedded in a mailto link and is associated with a payment or secure transaction. The vendor system 602 may generate a first text message or social media post (607) addressed to the customer 601(a). The first text message or social media post may include at least one mailto link. Each mailto link holds a token, which is generated by the e-commerce system 603. The vendor system 602 may further generate an SMS/Text message or social media post, such as Facebook, Twitter, GooglePlus Linkedin, Instagram, Pinterest, Swapchat, and Tumblr among others either separately or at the same time. The first SMS or social media post may be addressed to the phone number of the customer 601 or directed to the social media account of the customer 601 and include one or more mailto hyperlinks. The mailto link, with token, may be sent in a mass form of messaging to any number of customers. Each mailto link includes a destination address field that indicates an email address of the e-commerce system 603. Each mailto link may also include a token. The token may be located in various parts of the email.

Figure 7:
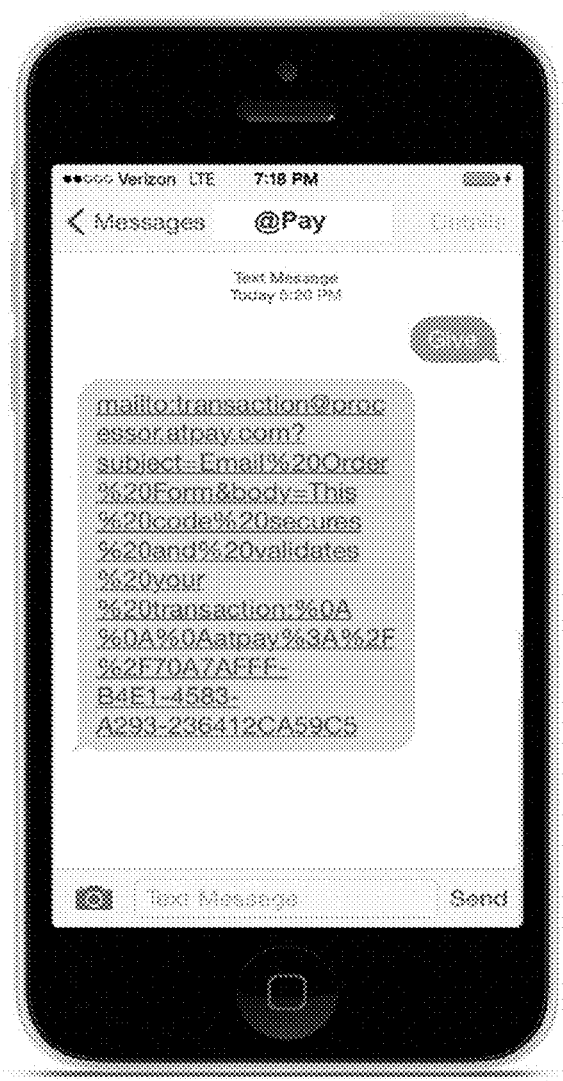
FIG. 7 is an example of a SMS with a mailto hyperlink included.

FIG. 7 is an example of an SMS message with a mailto hyperlink included. These mailto links may also be used in posts on social media networks. This mailto link may be embedded behind a word or an image. The system may further include a customer network interface that is configured to transmit the first SMS message or social media post. A customer 601(a), operating the customer mobile device, may access the SMS message or social media post and select one of the mailto links (608). In response, the customer mobile device 601 opens the email client 601(b) on the customer mobile device to generate a response email message (609).

Figure 8:
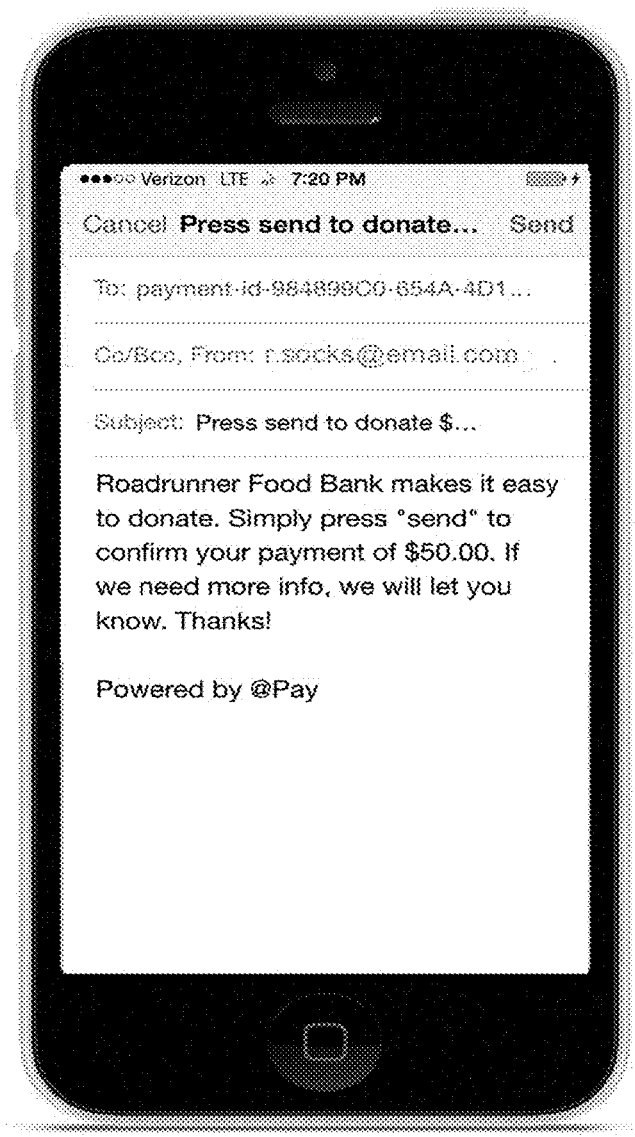
FIG. 8 is an example of a response email generated from the mailto link.

FIG. 8 is an example of a response email generated from the mailto link. The response email message may be configured to indicate a specific selection by the customer 601. The response email message may be responsive to the first SMS message, and may be addressed to the email address (610) of e-commerce system 603. The response email message may also include the token. The token is located in the 'To' field in this example, but the token may be located anywhere in the email.

The token or the identifier of the customer and the item identifier may be located in any field of the response email message. The any field may also include the token. The e-commerce system 603 confirms the validity of the reply email message (611), which may at least in part be based upon the token, and sends an electronic notification to the network interface relating to the confirmation. Authentication of the email may include, but is not limited to SPF DKIM. If the response email does not have the required token, the e-commerce system 603 may respond by sending a confirmation email with a token to the customer 601, and the customer 601, by selecting the link, may generate a response email addressed to the email e-commerce system with the token required to confirm the process. Alternatively or additionally, if additional information is required, the e-commerce system 603 may use a presale hook to look up information in a library held by the e-commerce system 603 or some other party to complete the transaction.

The processor and the network interface may perform an execution procedure based on the electronic notification, wherein the order execution procedure includes transferring money between the customer and the client system and placing the charges on the phone bill through a direct carrier billing process or a credit card or banking system. This order execution procedure may be based, at least in part, upon the token.

Alternatively or additionally, in an effort to streamline and increase selection, the e-commerce system may make use of a Uniform Resource Locator (URL) shortener with the token generator in the SMS and social media for registered customers to make payment by email. A vendor, using a control panel, may generate an SMS and or social media campaign, wherein each SMS message or social media post includes at least one URL link associated with a mailto link and token generated by the e-commerce system. For example, the e-commerce system may provide the vendor with the ability to generate emails including SMS, email, or social media by providing a graphical user interface (GUI). The GUI may allow the vendor to generate offers with tokens associated. During this process, each offer has a token associated with a shorter URL link generated by a URL shortener, which may be found in the token generator. The SMS and/or social media campaign is then distributed, via SMS/text messaging and/or social media, to the intended recipient(s). This may also be triggered by the customer requesting an offer. For example, to make a donation a customer may SMS a word to a phone number and which may trigger the SMS offer.

Figure 9:
FIG. 9 is an example of an SMS offer with short link.

FIG. 9 is an example of an SMS offer with short link where a customer texts the word "Give" to request a link. This message or post may trigger the e-commerce system to SMS a link using the URL shortener. This link requires fewer characters as compared to FIG. 7. Alternatively or additionally, this mailto links may be used in a social media format.

Figure 10:
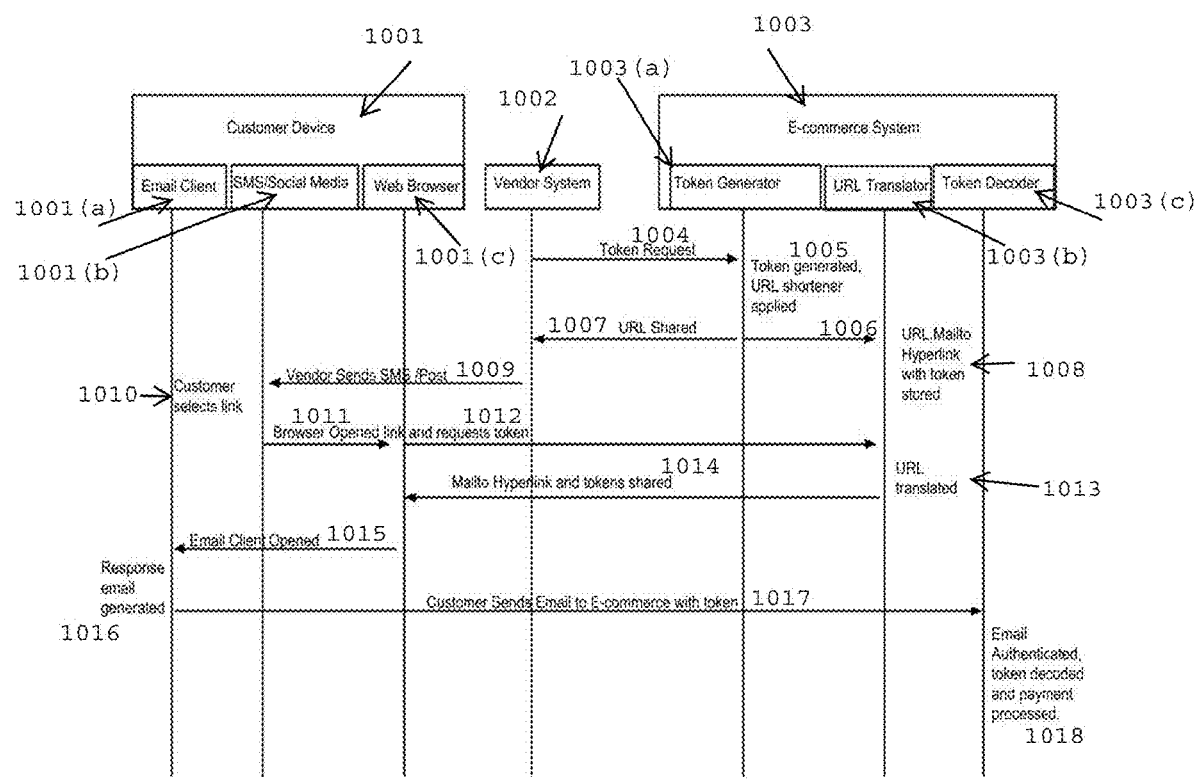
FIG. 10 illustrates a transactional flow diagram for using the email-based e-commerce system using a URL shortener and a token in SMS and social media for registered customers to make payment by email.

FIG. 10 illustrates a transactional flow diagram for using the email-based e-commerce system using a URL shortener and a token, in SMS and social media, for registered customers to make payment by email. Although the vendor system 1002 and the e-commerce system 1003 are described as separate entities for convenience of explanation, they may comprise a single system. The vendor 1002 may request at least one token (1004) from the e-commerce system's token generator 1003(a). The token is generated (1005) and associated or applied with a short URL link and shared (1006)

with the URL translator 1003(*b*). The vendor 1002 receives the short URL link (1007) and the URL translator 1003(*b*) holds the short URL link and associates it to the token (1008). The vendor 1002 may then use the short URL link in SMS and/or social media campaigns, offers and billing (1009). The customer recipient 1001(*b*) of the SMS and or social media may access the SMS and or social media via a customer device. The customer 1001(*b*) selects the short URL link (1010) and triggers the browser application to open (1011). The browser 1001(*c*) visits the URL and requests the full token (1012) from the e-commerce system's URL translator 1003(*b*). The URL translator 1003(*b*) matches the short URL link to the token (1013) and shares a mailto link with the full token (1014) with the customer device 1001(*c*). The customer device 1001 receives the mailto link with token via the web browser 1001(*c*) and triggers the email client 1001(*a*) to open (1015). The opening of the browser may not be visible to the customer. The customer's email client 1001(*a*) generates the response email (1016) with the full token and the email is addressed to the e-commerce system 1003. This email is sent (1017) to the e-commerce system 1003, and using the e-commerce system's token decoder unit 1003(*c*), authenticates the email, decodes the token and implements the transactions and processes the payment which may then process the transaction (1018).

This transaction may be for products, services, donations, a form of bill payment or invoicing, and stock trading using various media such as email, SMS, and social media. In addition to the customer receiving a message from the vendor, the customer may receive a link in other ways, for example, requesting it by messaging the system. A customer may receive an invoice or a bill to be paid via SMS. The customer may also request to pay a bill by messaging a word such as "PAY". The e-commerce system responds by sending a link that when selected generates a response email as described above in FIG. 10.

Figure 11:
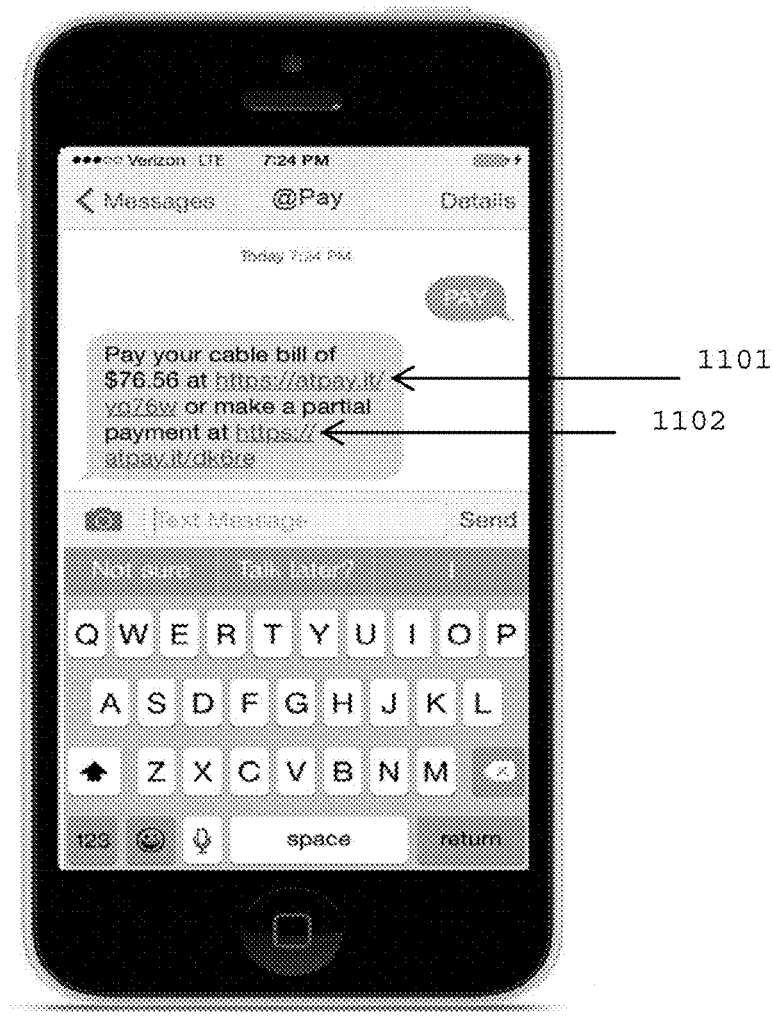
FIG. 11 is an example of short URLs used for email checkout, the first generates and immediate response email the second link a browser with options of mailto links.

FIG. 11 is an example of short URLs used for email checkout. The first link 1101 generates an immediate response email while the second link 1102 opens a browser with options of mailto links. The e-commerce system may also include a link that generates a web URL that offers a series of payment amounts. In this example, when the first link is selected for the full amount suggested a response email is generated in the same way described in FIG. 10.

Figure 12:
FIG. 12 is an example of a response email for bill payment.
Figure 13:
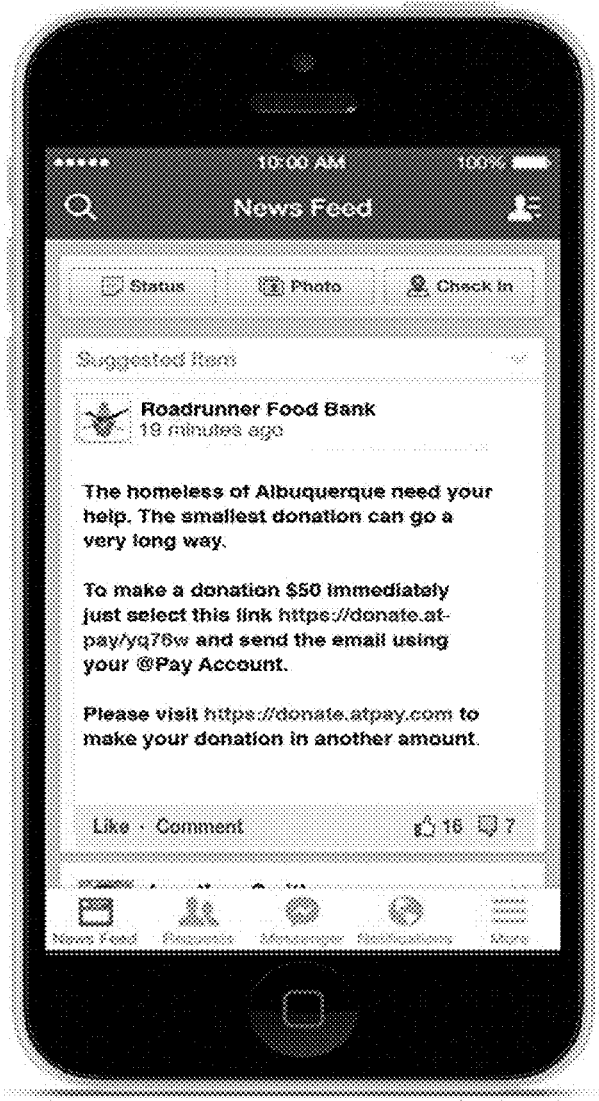
FIG. 13 is an example of a social media post as a solicitation for a donation.

FIG. 12 is an example of this response email for bill payment. The above described method may also be used in social media. The use of these links may also be used in social media formats. FIG. 13 is an example of a social media post as a solicitation for a donation.

Figure 14:
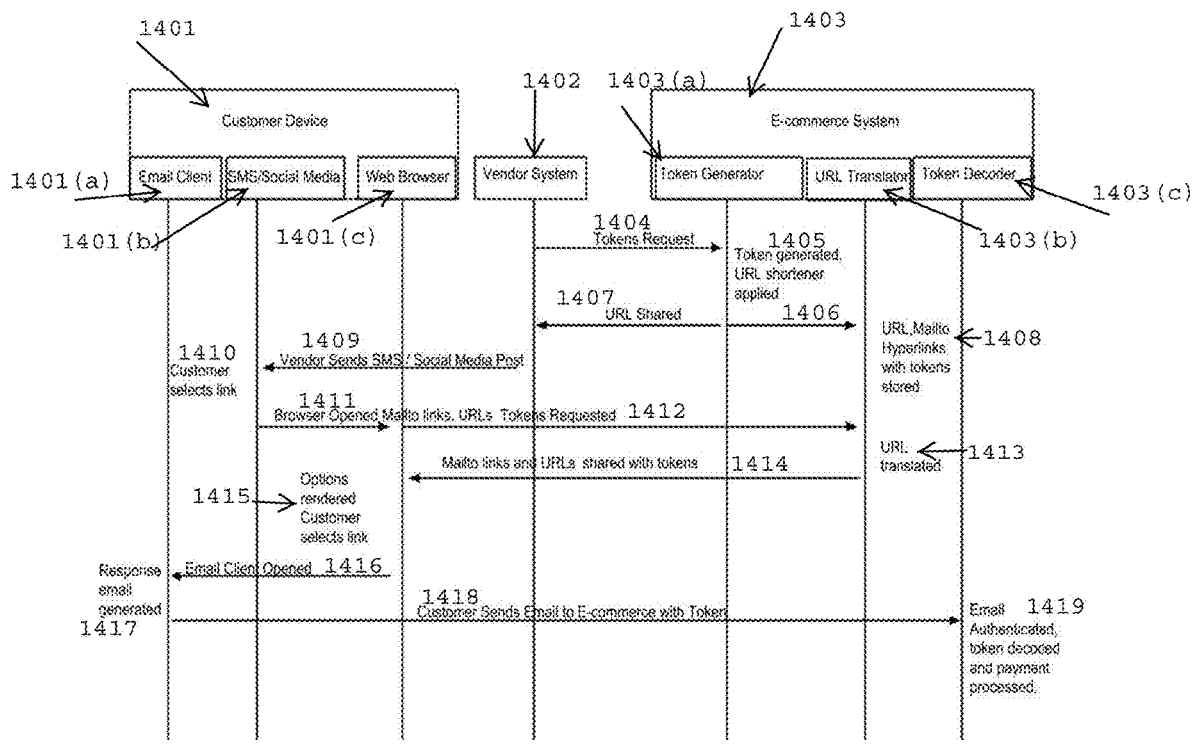
FIG. 14 illustrates a transactional flow diagram for using the email-based e-commerce system using a URL shortener and tokens in the SMS and social media with multiple choices for registered customers to make payment by email.

FIG. 14 illustrates a transactional flow diagram for using the email-based e-commerce system, using a URL shortener, and tokens in SMS and social media with multiple choices for registered customers to make payments via email. Although the vendor system 1402 and the e-commerce system 1403 are described as separate entities for convenience of explanation, they may comprise a single system. The vendor 1402 may request more than one token (1404) from the e-commerce system's token generator 1403(*a*) to give the customer a selection of options. The tokens are generated and associated or applied with a short URL link (1405) and shared with the URL translator (1406). The vendor 1402 receives the short URL link (1407) and the URL translator 1403(*b*) holds the short URL link and associates it to the token (1408). The vendor 1402 may then use the short URL link in SMS and/or social media campaigns, offers and billing (1409).

FIG. 11 is an example of short URL's used for email checkout. The first link 1101 generates an immediate response email and the second link 1102 opens a browser with several options of mailto links. FIG. 14 relates to the second link. The customer recipient 1401(*b*) of the SMS or social media posts may access the SMS and or social media posts via a customer device. This type of short URL link may also be used in social media posts, an example of which is shown FIG. 13. The customer 1401(*b*) selects the short URL link (1410) and triggers the browser application to open (1411). The browser visits the URL and requests the full tokens (1412) from the e-commerce system's URL translator 1403(*b*). The URL translator 1403(*b*) matches the short URL link to the token (1413) and shares a mailto link with the full token (1414) with the customer device 1401. The customer device 1401 receives the mailto link with token via the web browser 1401(*c*).

Figure 15:
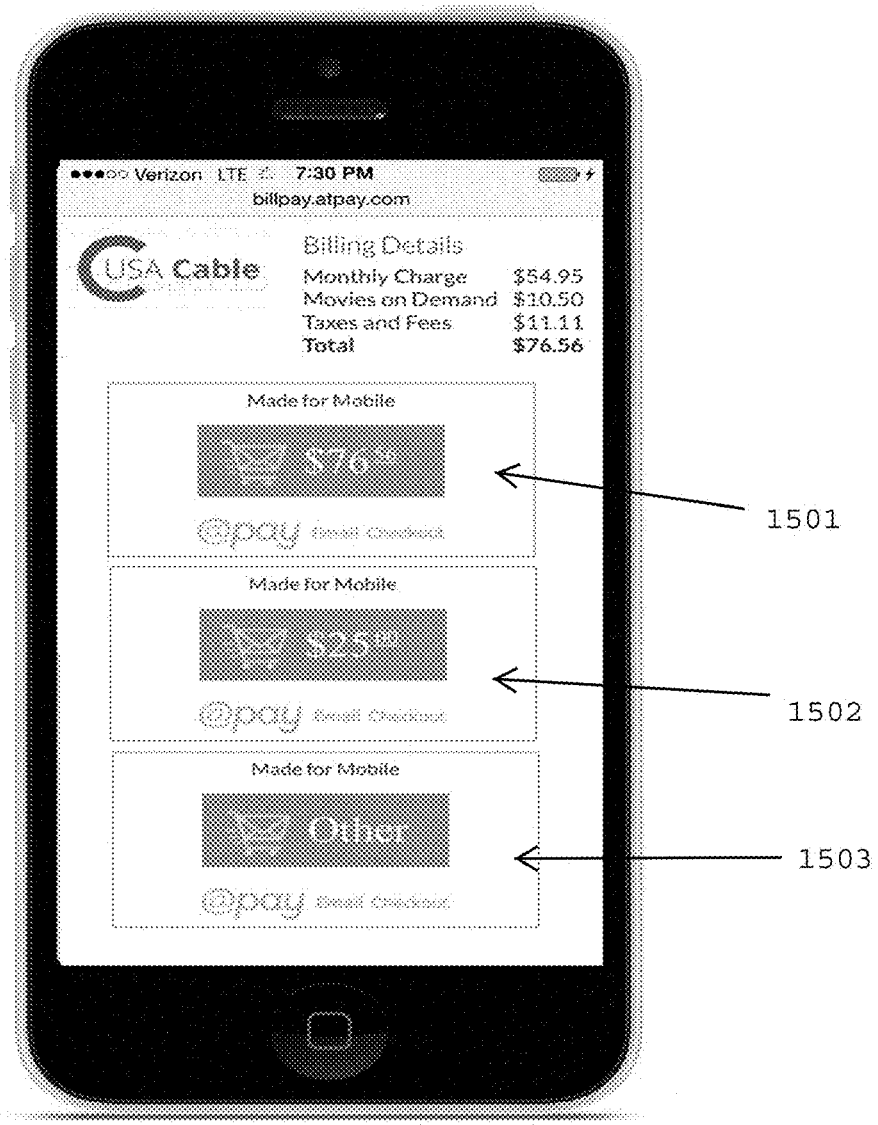
FIG. 15 is an example of a URL that offers multiple choices.

FIG. 15 is an example of a URL that offers multiple choices. The customer 1401(*c*) may select the mailto for $25 payment 1502 (1415) and this triggers the email client to open (1416). The customer's email client 1401(*a*) generates the response email with the full token (1417) and the email is addressed to the e-commerce system 1403.

Figure 16:
FIG. 16 is an example of a response email for an alternative amount.

FIG. 16 is an example of a response email. This email is sent (1418) to the e-commerce system 1403, and using the e-commerce system's token decoding unit 1403(*c*) authenticates the email, decodes the token and implements the transactions and processes the payment (1419) which may then process the transaction. The token is located in the 'To' field in this example, but the token may be located anywhere in the email.

Alternatively and additionally, the URL page with the selection of links may include a link that is an option to generate a specific amount.

Figure 17:
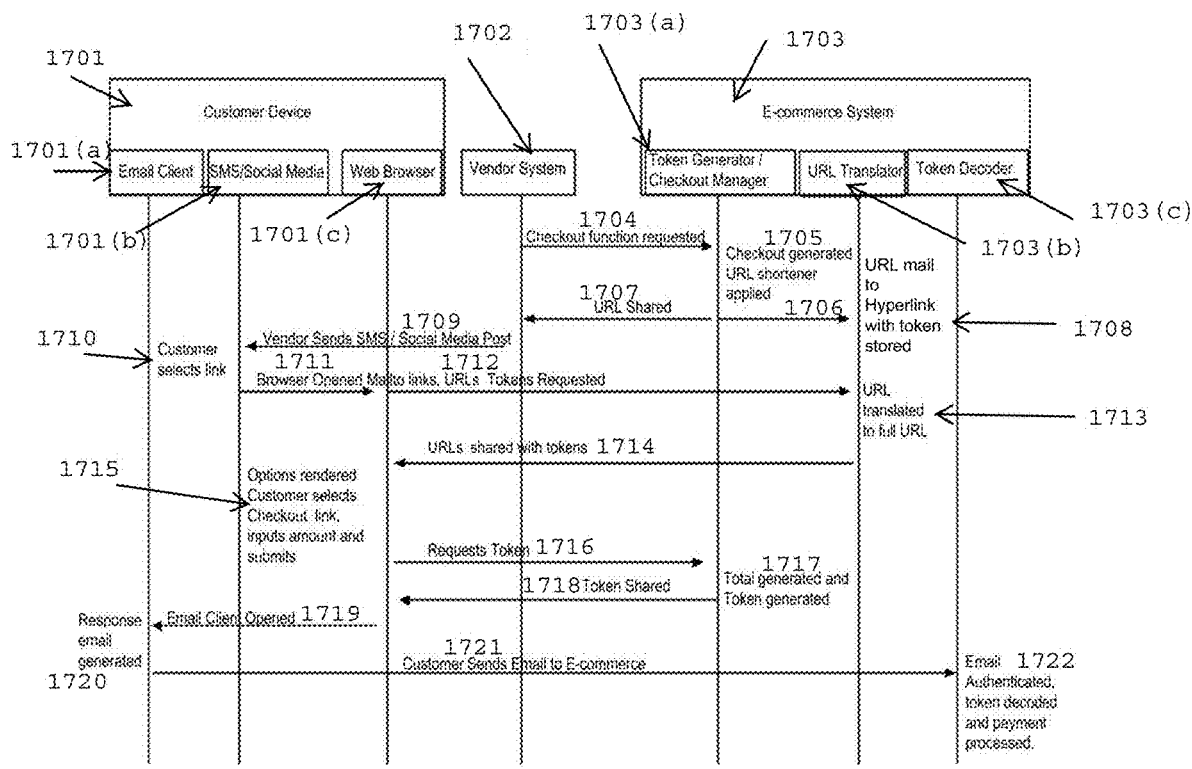
FIG. 17 illustrates a transactional flow diagram for using the email-based e-commerce system using a URL shortener with an option to input a specific amount via an email based web checkout with SMS and social media to make payment by email.

FIG. 17 illustrates a transactional flow diagram for using the email-based e-commerce system using a URL shortener with an option to input a specific amount via an email-based web checkout with SMS and social media for registered customers to make payment by email. Although the vendor 1702 and the e-commerce system 1703 are described as separate entities for convenience of explanation, they may comprise a single system. The vendor 1702 may request more than one token (1704) from the e-commerce system's token generator and checkout manager 1703(*a*) to give the customer a selection of options. One of these options may be the email-based web checkout or may only be the email-based web checkout. The tokens are generated and associated or applied with a short URL link (1705) and shared (1706) with the URL translator 1703(*b*). The vendor 1702 receives the short URL link (1707) and the URL translator holds the short URL link and associates it to the token (1708). The vendor 1702 may then use the short URL link in SMS and/or social media campaigns, offers and billing (1709).

FIG. 11 is an example of this URL on the customer device. This type of link 1102 may also be used in social media posts, as shown in FIG. 13. Each amount may be associated with a mailto link or a URL. The customer 1701(*b*) selects the short URL link (1710) and triggers the browser application to open (1711). The browser 1701(*c*) visits the URL and requests the full tokens (1712) from the e-commerce system's URL translator 1703(*b*). The URL translator 1703(*b*) matches the short URL link to the token (1713) and shares a mailto link with the full token (1714) with the customer device 1701. The customer device 1701 receives the mailto link with token via the web browser 1701(*c*). The customer device 1701 renders the mailto links and URL links on a web URL.

FIG. 15 is an example of a URL that offers multiple choices, one of which is the mobile web email-based checkout 1503. The customer 1701 selects the link for 'Other Amount' payment 1503 (1715) which triggers the device to open a window where the customer inputs information, in this example it is an amount to be paid.

Figure 18:
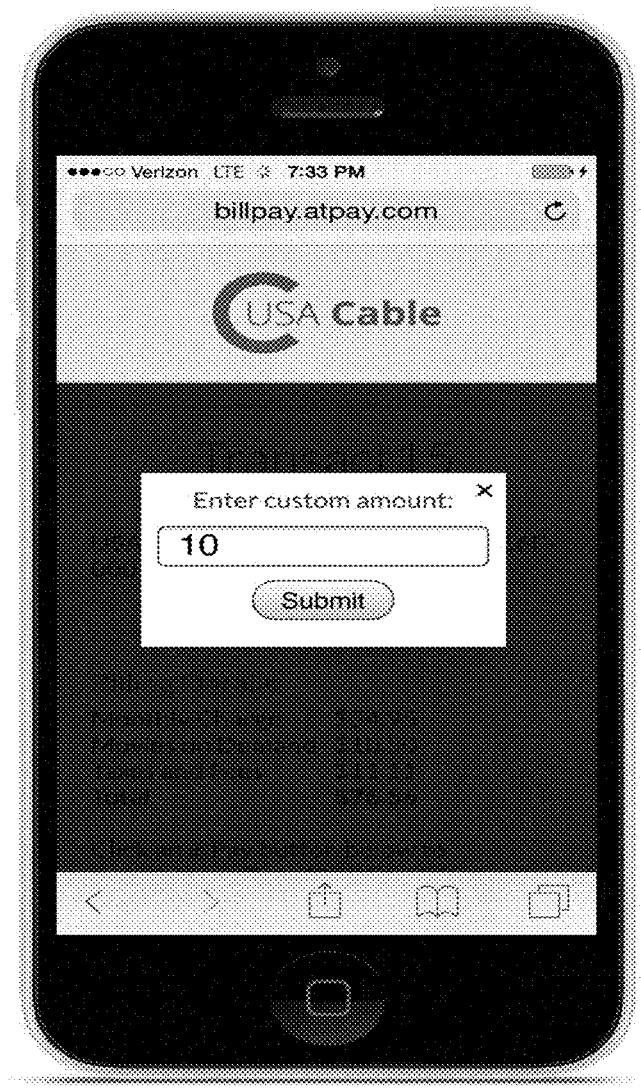
FIG. 18 is an example of the window where the customer can input a specific amount.

FIG. 18 is an example of the window where the customer can input a specific amount. When the customer selects submit and requests a token for the specific amount (1716) from the e-commerce system 1703, the e-commerce system's checkout manager and token generator 1703(*a*) generate a token for that amount (1717) and share it (1718) with the customer device 1701(*b*). The token is shared in a mailto link in a URL window (1719) that triggers the generation of a response email (1720). The customer 1701 may not need to make another selection. The URL page may not be visible to the customer 1701(*c*) and may automatically generate the response email with the token addressed to the e-commerce system 1703(*c*).

Figure 19:
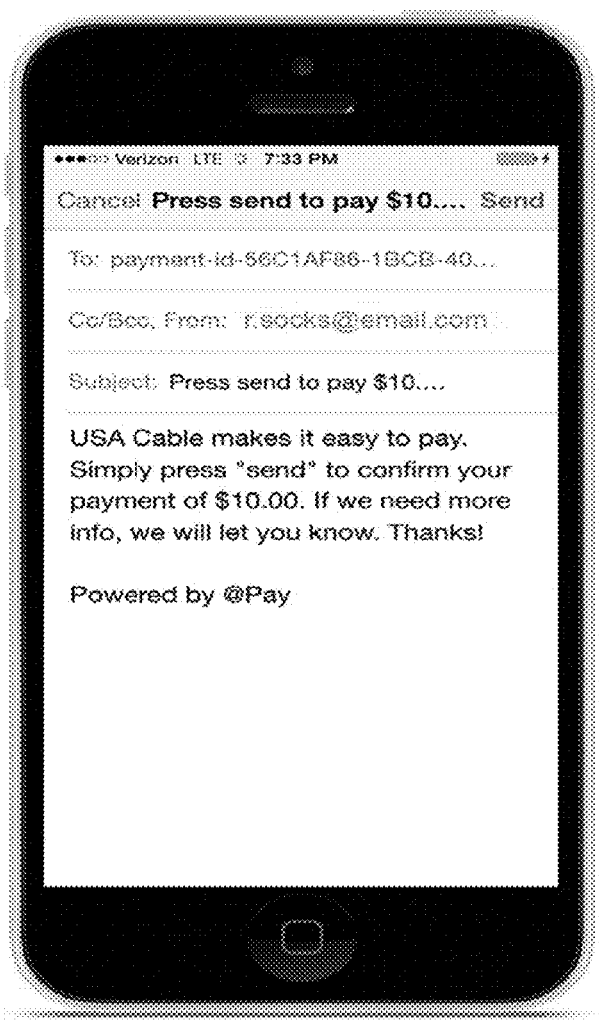
FIG. 19 is an example of a response email with a specific amount.

FIG. 19 is an example of a response email with a specific amount requested by the customer. This email is addressed to the e-commerce system 1703 and includes the token (1721). The customer 1701(*a*) sends the email (1721) and when the e-commerce system 1703 receives the email, the e-commerce system's token decoding unit 1703(*c*) authenticates the email, decodes the token and implements the transactions and processes the payment (1722), which may then process the transaction. If the response email or HTTP responses do not have the required token or an SPF DKIM check fails, the e-commerce system 1703 may respond with sending a confirmation email with a token to the customer 1701. The customer 1701 by selecting the link may generate a response email addressed to the email e-commerce system 1703 with the token required to confirming the process. Alternatively or additionally, if additional information is required, the e-commerce system 1703 may use a presale hook to look up information in a library held by the e-commerce system 1703 or some other party to complete the transaction.

Alternatively or additionally, SMS and social media formats may be used to message or post a request for an email offer. The customer registers with the e-commerce system and associates the address of their social media account or their phone number with their email address. When the customer signals they wish to make a payment by email through SMS or social media, the e-commerce system associates their SMS or post with their email address and sends an email offer message. The email offer message may include mailto links with token required for the amount advertised in the social media posting.

Figure 20:
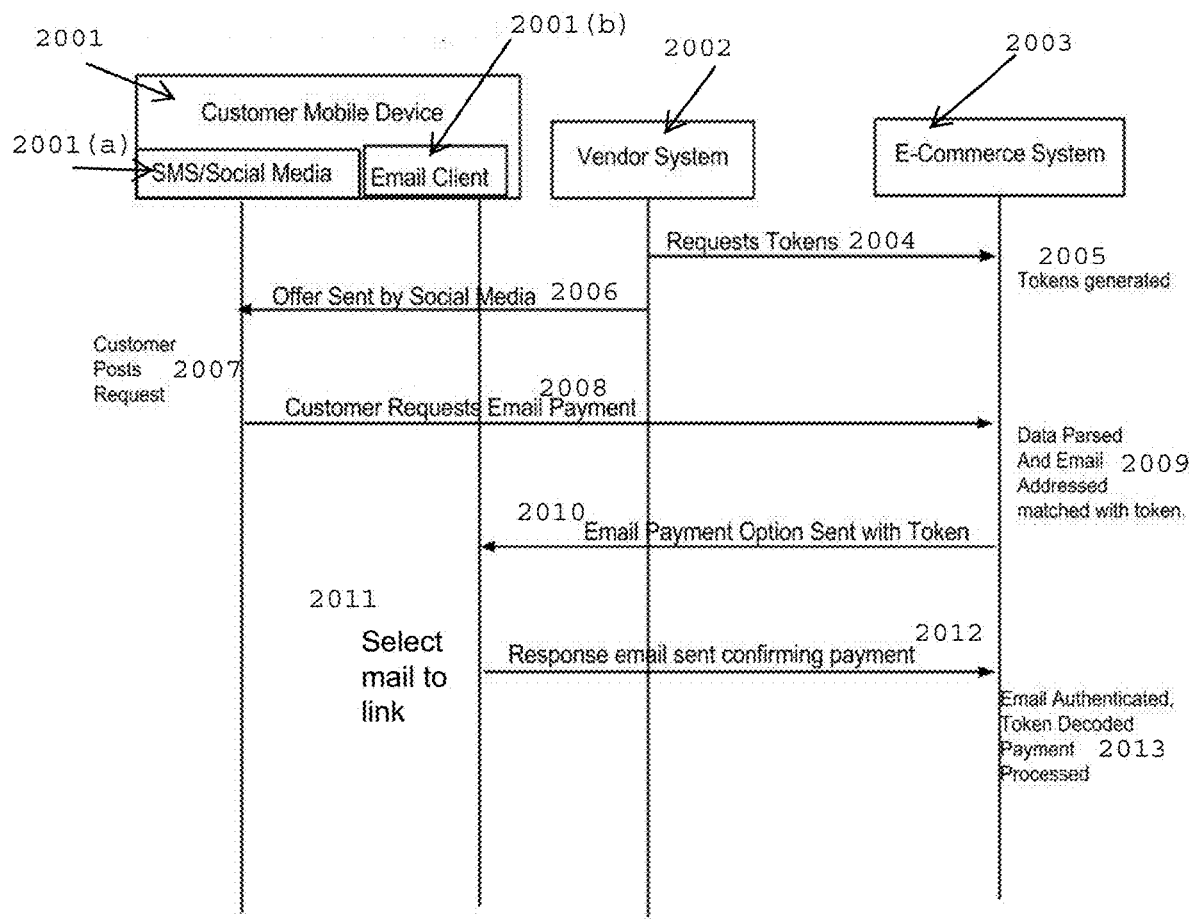
FIG. 20 illustrates a transactional flow diagram for use with @Pay's e-commerce system for email-based payments with requests from social media networks and SMS requests.

FIG. 20 illustrates a transactional flow diagram for use with @Pay's e-commerce system for email-based payments with requests from social media networks and SMS requests. Although the vendor 2002 and the e-commerce system 2003 are described as separate entities for convenience of explanation, they may comprise a single system. The vendor 2002 requests at least one token (2004) from the e-commerce system 2003. The e-commerce system 2003 stores these tokens. Each token is embedded in a mailto link and is associated with an offer of payment (2005). The vendor system 2002 may generate a first SMS or social media post (2006) that is addressed to the customer 2001(*a*). The first SMS or social media post may include advertising offers, bills, invoices, stock trades or donation or other opportunities to make a payment. If the customer 2001(*a*) wishes to make a payment by email, the customer may text back a message such as "PAY" (2007). Alternatively the vendor may supply a link that opens the email client or web browser and the customer writes in their email address (2008). The message from the customer may come to the e-commerce in various ways, for example, email, SMS, social media, or a Quick Response (QR) code application. The e-commerce system 2003 parses the information and matches the social media account, phone number or the incoming email address with the email address associated with the customer (2009). The incoming message or post may be the email address and may not require a match. If additional information is required the e-commerce system 2003 may perform a presale hook and look up required information in a library of the e-commerce system or other party.

The e-commerce system 2003 then generates an offer email with the required tokens embedded in mailto links (2010) and addressed to the customer's email address. The token may be located in various parts of the offer email. A customer 2001(*b*), operating the customer mobile device, may open the offer email using the email client and select one of the mailto links (2011). In response, the email client 2001(*b*) on the customer mobile device generates a response email message. The response email message may be responsive to the offer email, and may be addressed to the email address of e-commerce system 2003 (2012). The response email message may also include the token. The token may be located anywhere in the email. Any field of the response email message may compromise the identifier of the customer and the item identifier. The e-commerce system 2003 confirms the validity of the reply email message (2013), which may at least in part be based upon the token, and sends an electronic notification to the network interface relating to the confirmation. The e-commerce system 2003 authenticates the email and decodes the token and processes the payment or transaction (2013). If the response email or HTTP responses do not have the required token or if the SPF DKIM check fails, the e-commerce system 2003 may respond with sending a confirmation email with a token to the customer 2001 and the customer 2001, by selecting the link, may generate a response email addressed to the email e-commerce system 2003 with the token required to confirming the process. Alternatively or additionally, if additional information is required, the e-commerce system 2003 may use a presale hook to look up information in a library held by the e-commerce or some other party to complete the transaction.

Alternatively or additionally, the @Pay email based web checkout may be integrated directly to the social media interface. The vendor having registered with the e-commerce system and the social media network creates a profile on the social media network, which includes an email based checkout. This checkout may be for products, services, bill payment, donations, stocks, or the like.

Figure 21:
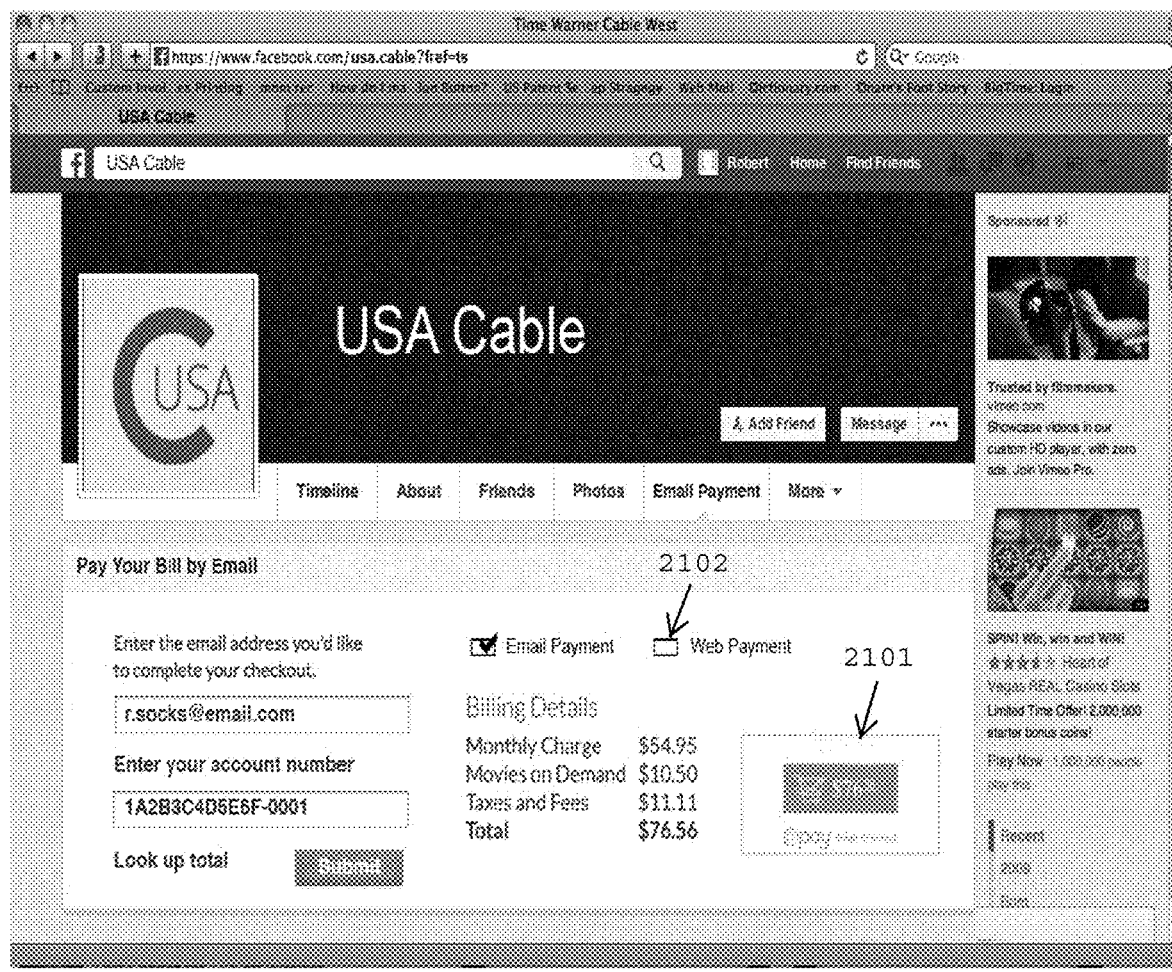
FIG. 21 is an example of an interface for email-based checkout.

FIG. 21 is an example of an interface for email based checkout. In this example bill payment is used. However, this may be another product, service, stock trade or donation. Although FIG. 21 illustrates an interface that is web-based, it may also be an application.

Figure 22:
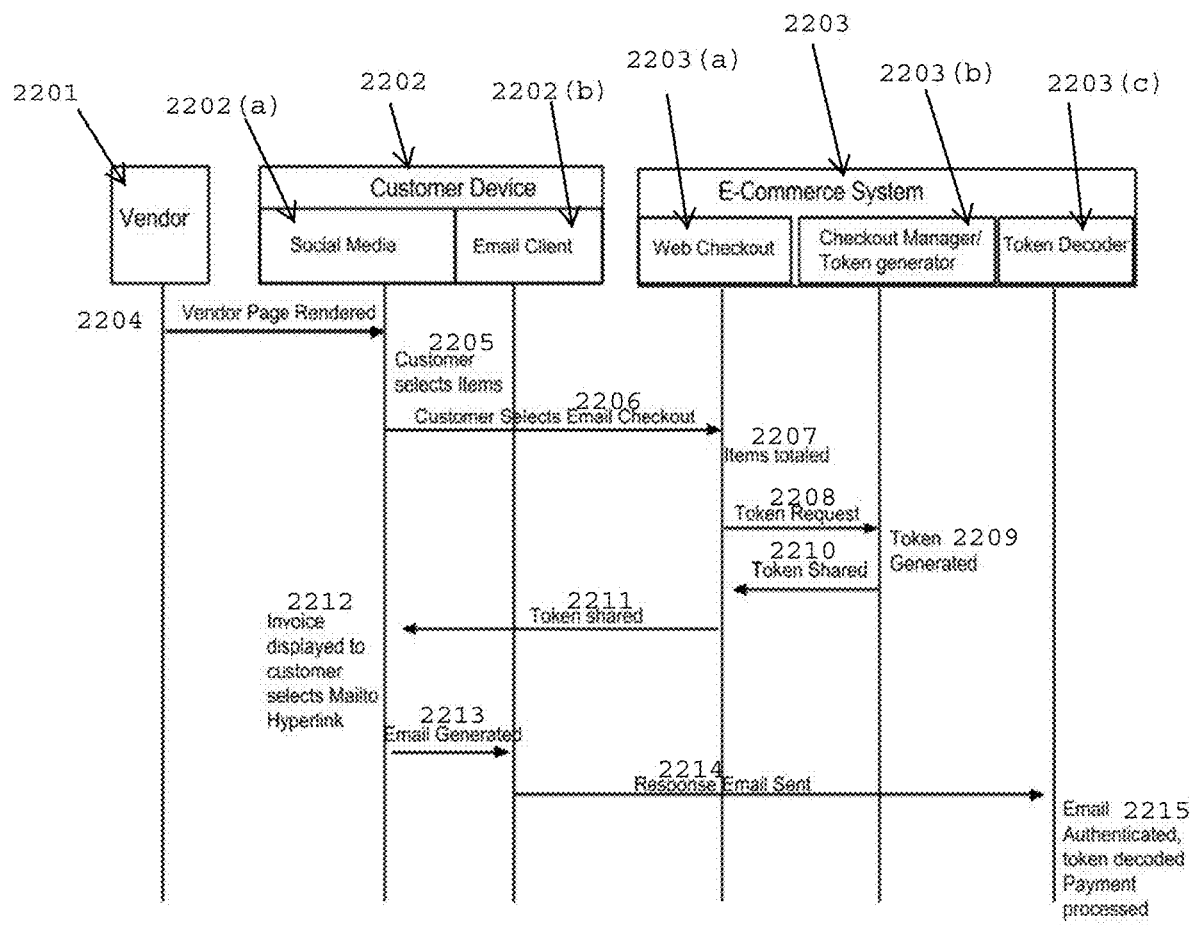
FIG. 22 illustrates a transactional flow diagram for use with @Pay's e-commerce system for email-based payments integration interface with Social Media.

FIG. 22 illustrates a transactional flow diagram for use with @Pay's e-commerce system for email based payment integrated with social media. Although the vendor 2201 and the e-commerce system 2203 are described as separate entities for convenience of explanation, they may comprise a single system. A customer 2202(*a*) visiting a vendor page (2204) may be able to choose multiple items in a cart, request a variety of amounts, or request an amount owed. The customer 2202(a) may input the needed information and select submit to select the requested items (2205). The customer 2202(a) selects the email based checkout window, selects the email payment option, and requests a total amount owed (2206) from the e-commerce system's web checkout unit 2203(a). The web checkout unit 2203(a) totals the amount owed (2207). This may be based on the information in the request or the e-commerce system 2203 may perform a presale hook and look up the required information based on the account number, email address, or some other identifier. The web checkout unit 2203(a) requests a token (2208) from the checkout manager and token generator 2203(b). The checkout manager and token generator 2203(b) generates a token (2209) based on the amount owed and shares the token (2209) with the web checkout unit 2203(a). The social media application 2202(a) on the customer's device receives the token (2211) and displays the mailto link with token on the browser page (2212).

FIG. 21 shows an example of a button 2101 with the mailto link embedded behind the image. There may be more than one option generated. Each mailto link is associated with a token generated by the e-commerce system 2203. The token may be located in various parts of the interface. A customer 2202(a), operating the customer mobile device, may select one of the mailto links (2213). In response, the email client 2202(b) on the customer mobile device is opened and generates a response email message. The response email message may be addressed (2214) to the e-commerce system 2203 and may also include the token. The token may be anywhere in the email. Any field of the response email message may compromise the identifier of the customer and the item identifier. The e-commerce system 2203 confirms the validity of the response email message, which may at least in part be based upon the token, and sends an electronic notification to the network interface relating to the confirmation. The e-commerce system's checkout manager 2203(b) authenticates the email, decodes the token, and processes the payment or transaction (2215). If the response email or HTTP responses do not have the required token, the e-commerce system 2203(c) may respond with sending a confirmation email with a token to the customer 2202 and the customer 2202 by selecting the link may generate a response email addressed to the email e-commerce system 2203 with the token required to confirming the process. Alternatively or additionally if additional information is required the e-commerce system 2203 may use a presale hook to look up information in a library held by the e-commerce system 2203 or some other party to complete the transaction.

Alternatively or additionally the @Pay email-based web checkout may be integrated directly to the social media interface and may offer a confirmation of payment via HTTP. The vendor having registered with the e-commerce system and the social media network may create a profile on the social media network, which includes an email based checkout. This checkout may be for products, services, bill payment, donations, stocks or the like.

Referring back to FIG. 21, the customer may alternatively choose to select the box for 'Web Payment' 2102.

Figure 23:
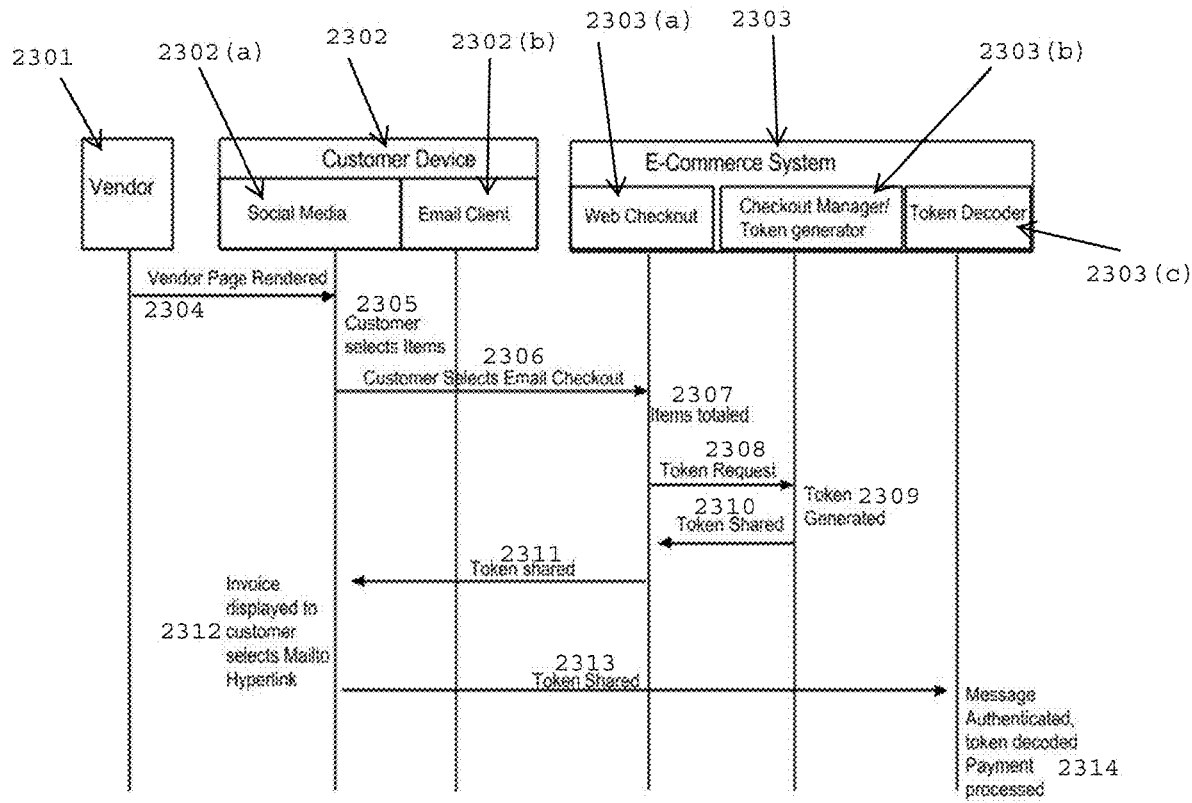
FIG. 23 illustrates a transactional flow diagram for use with @Pay's e-commerce system for email-based payments integration interface with Social Media using a web checkout.

FIG. 23 illustrates a transactional flow diagram for use with @Pay's e-commerce system for email based payment integrated with social media using a web checkout with confirmation of payment by HTTP. In FIG. 23 bill payment is used as the example, however, this process applies to products, services, stock trades, donations, and the like.

Although the vendor 2301 and the e-commerce system 2303 are described as separate entities for convenience of explanation, they may comprise a single system. A customer 2302(a) visiting a vendor page (2304) may be able to choose multiple items in a cart, request a variety of amounts, or request an amount owed. The customer 2302(a) may input the needed information, select the desired items, and select submit (2305). The customer 2302(a) selects the email based checkout window, selects the web payment option, and requests a total amount owed (2306) from the e-commerce system's web checkout unit 2303(a). The web checkout unit 2303(a) totals the amount owed (2307). This may be based on the information in the request or the e-commerce system 2303 may perform a presale hook and look up the required information based on the account number, email address or some other identifier. The web checkout unit 2303(a) requests a token (2308) from the checkout manager and token generator 2303(b). The checkout manager and token generator 2303(b) generates a token (2309) based on the amount owed and shares the token (2310) with the web checkout unit 2303(a).

The social media application 2302(a) on the customer's device receives the token (2311) and generates a link on the page associated with the token (2312). There may be more than one option generated. Each link is associated with a token generated by the e-commerce system 2303. The token may be located in various parts of the interface. A customer 2302(a), operating the customer mobile device, may select one of the links to confirm payment (2312). The customer device 2302(a) shares the token (2313) with the e-commerce system's token decoder unit 2303(c). The e-commerce system 2303(c) confirms the validity of the message, which may at least in part be based upon the token, decodes the token and sends an electronic notification to the network interface relating to the confirmation. The e-commerce system's checkout manager and token generator 2303(b) authenticates the email and decodes the token and processes the payment or transaction (2314). If the HTTP responses do not have the required token, the e-commerce system 2303 may respond with sending a confirmation email with a token to the customer 2302 and the customer 2302 by selecting the link may generate a response email addressed to the email e-commerce system 2303 with the token required to confirming the process. Alternatively or additionally, if additional information is required, the e-commerce system 2303 may use a presale hook to look up information in a library held by the e-commerce system 2303 or some other party to complete the transaction. Although the example for the checkout uses Facebook this could be applied to any social media.

The explanations disclosed herein describe public posts in social media. These methods may be used in a private posting or direct messaging. Although URL and mailto links are pictured in the text fields of posts or messages where customers may type, these links may be placed in various parts of the interface.

Figure 24:
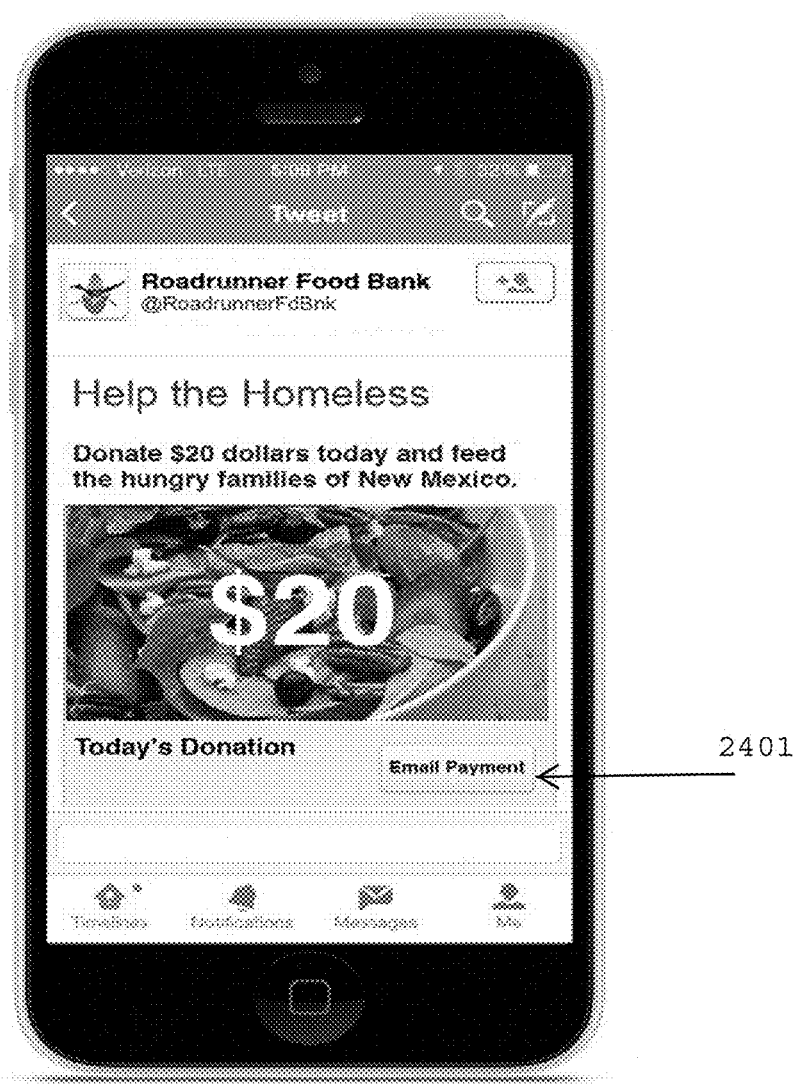
FIG. 24 is an example of an alternative placement of an email payment button on a social media page.

FIG. 24 is an example of an alternative placement of an email payment button 2401 on a social media page. This button may be used to generate a payment response or drive a customer to an email-based checkout.

Figure 25:
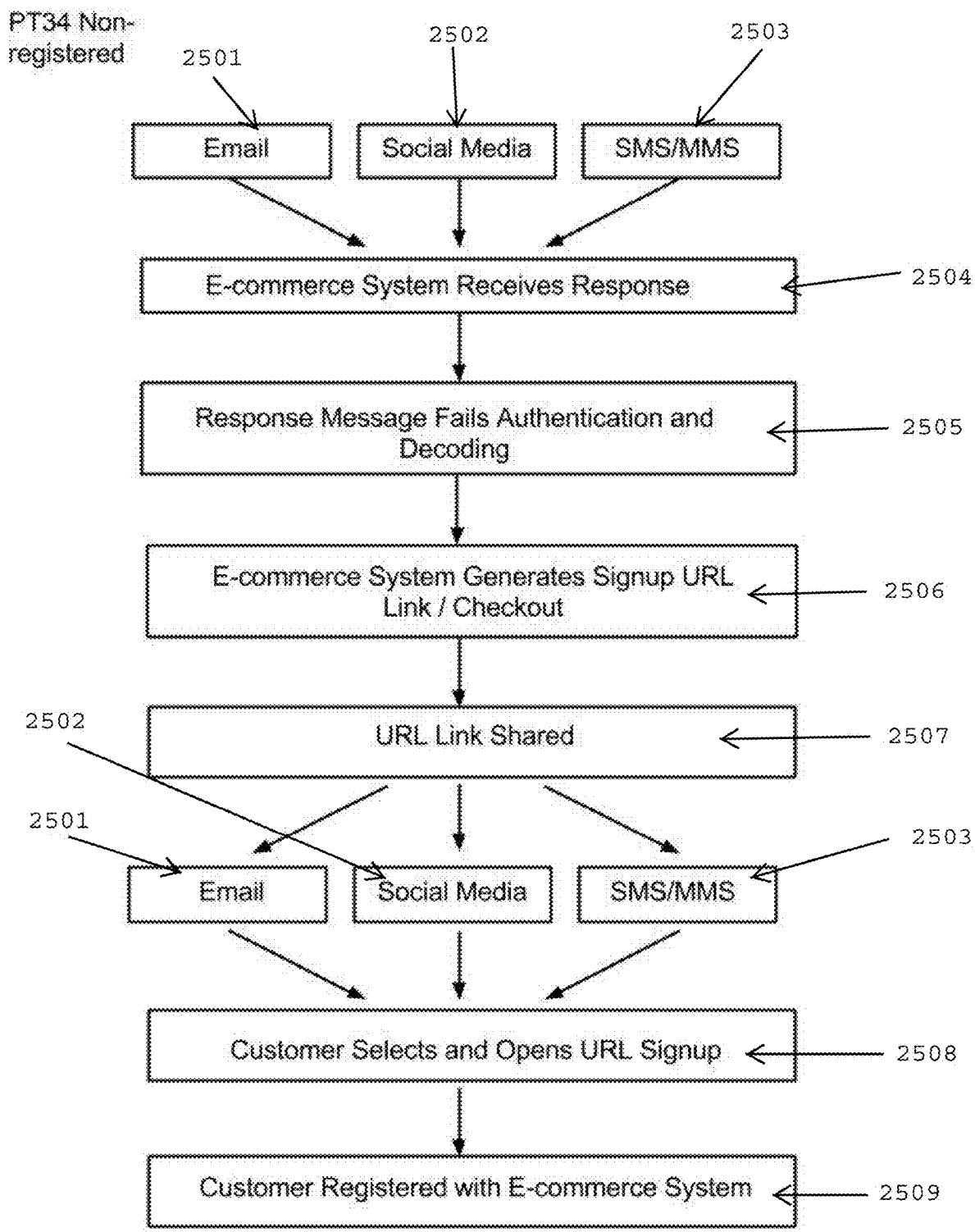
FIG. 25 illustrates a diagram describing the response of the e-commerce system to non-registered customers with email, SMS and Social Media.

FIG. 25 illustrates a diagram describing the response of the e-commerce system to non-registered customers with email, SMS and social media. Customers receiving a payment offer by email 2501, social media 2502, or SMS 2503 may respond to the offer by sending a response message by email, social media or SMS, which is associated to the offer email. The e-commerce system may receive a response message via email, social media or SMS (2504). The e-commerce system may parse the information and attempt authentication through various methods, one of which may be token decoding. Authentication may fail for various reasons (2505), for example, the customer may not be registered and their email address, phone number or social media account may not be registered the e-commerce system. Some messages may be missing the token and email based messages my fail an SPF DKIM check. If the messages cannot be authenticated the e-commerce system generates a signup URL link and shares the link with the customer (2506). This URL link may be shared through email 2501, social media 2502, or SMS 2503 (2507). The customer selects the URL link and opens a signup page on a web browser where they input necessary information for example name and credit card (2508). The customer registers with the e-commerce system and the e-commerce system can authenticate messages from the customer (2509).

The methods described herein may be used for any form of payments. Vendors are allowed to invoice their clients via email. The invoicing may be performed by generating mailto links associated with amounts owed or other transactional information. The following describes the sequence of actions for a bill pay system and invoicing system. The vendors may use their own invoicing program or an interface of the email based e-commerce system, similar to the system shown in U.S. patent application Ser. No. 14/216,256, filed Mar. 17, 2014 entitled "Peer to Peer Email Based Transactions" which is incorporated by reference in its entirety. The vendor generates an invoice as either an attachment or as part of the content of the email. The mailto link may be in the attachment or content of the email. The invoice message may be transmitted to multiple customers or to individual customers. These emails may also be sent automatically at a designated time. For example, the system may be able to schedule email to be automatically sent once a month at an appointed date to collect dues or rent. There may be multiple choices offered to the customer in the invoice email, each choice associated with a different payment option, for example, "Pay Full Amount" "Pay Minimum" "Or Pay from account ending in 4013." Once the email is received by the email payment gateway the information is parsed and the payment processed. The vendor and customer are notified of a successful transaction. For individuals not yet registered with the email payment gateway, they are sent to a URL page where they may complete the transaction and signup for email based payments.

Customers wishing to pay invoices using the email payment gateway may use the service in various ways. The email based e-commerce system designs an interface where registered members may manage their @Pay accounts. On this interface the customer may find a list of vendors using the email payment gateway and request to pay using an email based e-commerce bill paying method. This request notifies the vendor and the vendor updates the account and begins to bill the customer via email, SMS, or social media. Alternatively, a vendor may add a plugin to their webpage where customers may enter an email address to notify the vendor of their desire to pay by email. In another embodiment, where the vendor wishes to transition to email based payments, the vendor may send registration emails to customers. The registration emails may comprise at least one mailto link associated with the e-commerce system. When the customer responds to the email, the e-commerce system may be configured to parse the responses. If the customer is already registered (for example, if the customer has an account with a separate vendor), the transaction may be processed and the vendor and the customer may be notified that the account is configured. If the customer is not registered with the e-commerce system, then the e-commerce system may be configured to send another email to the customer with a URL link to register with the email based e-commerce system. This URL webpage collects the necessary information to configure the account. When completed the vendor and the customer are notified.

In another embodiment secure information may be exchanged (such as managing a credit card account or bank account). The settings, created by either the customer or the vendor, may be integrated on the customer's account page. In the example of the credit card transaction, the customer may receive an email with mailto links each describing an amount to be paid, for example, one such amount may be the "minimum due." This email may be automatically sent to the customer before the payment is due. Or if the credit card management system detects fraud the customer may receive an email determining the details of the activity or a response button to freeze the account.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for improving security of e-commerce computer networks using Simple Mail Transfer Protocol (SMTP), the method comprising:
   generating a first token for a transaction;
   generating a short message service (SMS) message that includes a mailto hyperlink based on the first token;
   transmitting the SMS message to a customer;
   receiving a SMTP response that includes the first token from the customer, wherein the response is based on the mailto hyperlink;
   authenticating the SMTP response based on an email address of a sender of the SMTP response and the first token received in the SMTP response; and
   on a condition that the SMTP response is authenticated, permitting the customer to perform the transaction.

2. The method of claim 1, further comprising:
   generating a first SMTP simple mail transfer protocol (SMTP) email message that includes at least one mailto hyperlink; and
   transmitting the first SMTP email message to the customer, wherein the first SMTP email message and the SMS message are sent at a same time.

3. The method of claim 1, wherein the mailto hyperlink includes the first token.

4. The method of claim 1, wherein the mailto hyperlink includes a destination address field that indicates an email address of an e-commerce server.

5. The method of claim 1, wherein the email address of the sender of the SMTP response is authenticated using DomainKeys Identified Mail (DKIM) or Sender Policy Framework (SPF) protocols.

6. The method of claim 1, wherein the mailto hyperlink is accessed via a shortened URL.

7. A method for improving security of e-commerce computer networks using Simple Mail Transfer Protocol (SMTP), the method comprising:
   generating a first token for a transaction;
   generating a social media that includes at least one mailto hyperlink based on the first token;
   receiving a SMTP response that includes the first token from a customer;
   authenticating the SMTP response based on an email address of a sender of the SMTP response and the first token received in the SMTP response; and
   on a condition that the SMTP response is authenticated, permitting the customer to perform the transaction.

8. The method of claim 7, wherein the at least one mailto hyperlink is accessed via a shortened URL.

9. The method of claim 7, wherein the at least one mailto hyperlink includes the first token.

10. The method of claim 7, wherein the at least one mailto hyperlink includes a destination address field that indicates an email address of an e-commerce system.

11. The method of claim 7, wherein the email address of the sender of the SMTP response is authenticated using DomainKeys Identified Mail (DKIM) or Sender Policy Framework (SPF) protocols.

* * * * *